United States Patent
Tynan, Jr. et al.

(10) Patent No.: US 9,598,518 B2
(45) Date of Patent: Mar. 21, 2017

(54) CONTINUOUS BULK POLYMERIZATION OF VINYL MONOMERS

(71) Applicant: Intertape Polymer Corp., Bradenton, FL (US)

(72) Inventors: John K. Tynan, Jr., Port Huron, MI (US); Mark A. Lewandowski, Fort Gratiot, MI (US); Richard W. St. Coeur, Marysville, MI (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 5 days.

(21) Appl. No.: 14/616,864

(22) Filed: Feb. 9, 2015

(65) Prior Publication Data

US 2015/0152207 A1 Jun. 4, 2015

Related U.S. Application Data

(63) Continuation of application No. 12/622,573, filed on Nov. 20, 2009, now abandoned, which is a
(Continued)

(51) Int. Cl.
*B01J 8/00* (2006.01)
*C08F 220/10* (2006.01)
(Continued)

(52) U.S. Cl.
CPC .......... *C08F 220/10* (2013.01); *B29C 47/364* (2013.01); *B29C 47/369* (2013.01);
(Continued)

(58) Field of Classification Search
CPC ..................................... C08F 2/02; B01J 8/00
See application file for complete search history.

(56) References Cited

U.S. PATENT DOCUMENTS 3,551,396 A 12/1970 Lanthier
3,821,330 A 6/1974 Free
(Continued)

FOREIGN PATENT DOCUMENTS

DE 19548136 6/1997
DE 19638094 3/1998
(Continued)

OTHER PUBLICATIONS

EP, Search Report; European Patent Application No. 15150831.4 (Mar. 24, 2015).
(Continued)

*Primary Examiner* — Richard A Huhn
(74) *Attorney, Agent, or Firm* — Thompson Hine LLP

(57) ABSTRACT

A method for continuous bulk polymerization is disclosed that includes providing a planetary roller extruder having a plurality of planetary roller zones, introducing an acrylate monomer, a di-vinyl monomer, and a hydroxyl functional acrylic monomer into the planetary roller extruder, introducing an initiator into the planetary roller extruder for initiation of a free-radical polymerization of the acrylate monomer, the di-vinyl monomer, and the hydroxyl functional acrylic monomer to form an acrylic polymer, maintaining the temperature of the free-radical polymerization in the planetary roller extruder below 240° C., and discharging a portion of the acrylic polymer from the planetary roller extruder, and returning the portion of the acrylic polymer to one or more of the plurality of planetary roller zones.

22 Claims, 10 Drawing Sheets

Related U.S. Application Data continuation-in-part of application No. 11/620,835, filed on Jan. 8, 2007, now abandoned, application No. 14/616,864, filed on Feb. 9, 2015, which is a continuation-in-part of application No. 12/242,108, filed on Sep. 30, 2008, now Pat. No. 7,906,598, which is a continuation-in-part of application No. 11/845,807, filed on Aug. 28, 2007, now Pat. No. 7,829,640.

(60) Provisional application No. 60/761,535, filed on Jan. 24, 2006, provisional application No. 60/841,079, filed on Aug. 30, 2006, provisional application No. 60/853,578, filed on Oct. 23, 2006.

(51) Int. Cl.

| | | |
|---|---|---|
| *B29C 47/42* | (2006.01) | |
| *C08F 2/01* | (2006.01) | |
| *B29C 47/36* | (2006.01) | |
| *B29C 47/50* | (2006.01) | |
| *C08K 11/00* | (2006.01) | |
| *C08F 2/02* | (2006.01) | |
| *B29C 47/00* | (2006.01) | |
| *B29K 33/00* | (2006.01) | |
| *B29K 105/00* | (2006.01) | |
| *C08F 220/18* | (2006.01) | |

(52) U.S. Cl.
CPC .............. *B29C 47/42* (2013.01); *B29C 47/50* (2013.01); *C08F 2/01* (2013.01); *C08K 11/00* (2013.01); *B01J 8/00* (2013.01); *B29C 47/0009* (2013.01); *B29K 2033/12* (2013.01); *B29K 2105/005* (2013.01); *B29K 2105/0032* (2013.01); *B29K 2105/0044* (2013.01); *C08F 2/02* (2013.01); *C08F 2220/1825* (2013.01)

(56) References Cited

U.S. PATENT DOCUMENTS

| | | |
|---|---|---|
| 3,968,059 A | 7/1976 | Shimada et al. |
| 3,991,129 A | 11/1976 | Daniels |
| 4,061,708 A | 12/1977 | Lazarus et al. |
| 4,158,571 A | 6/1979 | Lynch et al. |
| 4,192,637 A | 3/1980 | Chong |
| 4,209,599 A | 6/1980 | Brady et al. |
| 4,220,580 A | 9/1980 | Rowatt |
| 4,275,177 A | 6/1981 | Walkenhorst et al. |
| 4,289,409 A | 9/1981 | Brand |
| 4,324,868 A | 4/1982 | Maeda |
| 4,393,171 A | 7/1983 | Bracke et al. |
| 4,487,897 A | 12/1984 | Matsuoka et al. |
| 4,515,008 A | 5/1985 | Matsushita et al. |
| 4,546,160 A | 10/1985 | Brand et al. |
| 4,595,709 A | 6/1986 | Reischl |
| 4,619,979 A | 10/1986 | Kotnour et al. |
| 4,714,747 A | 12/1987 | Bruzzone et al. |
| 4,810,523 A | 3/1989 | Williams et al. |
| 4,814,373 A | 3/1989 | Frankel et al. |
| 4,843,134 A | 6/1989 | Kotnour et al. |
| 4,849,489 A | 7/1989 | Benhamou et al. |
| 4,898,897 A | 2/1990 | Kiyohara et al. |
| 4,923,919 A * | 5/1990 | Frazee .............. C08F 220/18 427/208.4 |
| 4,968,535 A | 11/1990 | Terai et al. |
| 5,194,525 A | 3/1993 | Miura et al. |
| 5,210,132 A | 5/1993 | Matsubara et al. |
| 5,362,448 A | 11/1994 | Kawakami et al. |
| 5,484,882 A | 1/1996 | Takada et al. |
| 5,521,263 A | 5/1996 | Seeger et al. |
| 5,539,033 A | 7/1996 | Bredahl et al. |
| 5,574,117 A | 11/1996 | Yoshida et al. |
| 5,599,888 A | 2/1997 | Higuchi et al. |
| 5,602,216 A | 2/1997 | Juvet |
| 5,637,646 A | 6/1997 | Ellis |
| 5,637,662 A | 6/1997 | Relvini et al. |
| 5,641,281 A | 6/1997 | Russell et al. |
| 5,703,184 A | 12/1997 | Rujita et al. |
| 5,726,258 A | 3/1998 | Fischer et al. |
| 5,744,555 A | 4/1998 | Ames et al. |
| 5,801,224 A | 9/1998 | Narayan et al. |
| 5,886,112 A | 3/1999 | Vuillemin et al. |
| 5,902,865 A | 5/1999 | Gausepohl et al. |
| 5,914,148 A | 6/1999 | Kazemzadeh |
| 5,952,449 A | 9/1999 | Aminaka et al. |
| 5,962,604 A | 10/1999 | Rath |
| 6,074,084 A | 6/2000 | Kolossow |
| 6,100,360 A | 8/2000 | Twu et al. |
| 6,100,369 A | 8/2000 | Miyajima et al. |
| RE36,855 E | 9/2000 | Bredahl et al. |
| 6,162,879 A | 12/2000 | Galewski |
| 6,184,285 B1 | 2/2001 | Hatfield et al. |
| 6,197,264 B1 | 3/2001 | Korhonen et al. |
| 6,288,196 B1 | 9/2001 | Takahashi et al. |
| 6,362,296 B1 | 3/2002 | Singahal et al. |
| 6,380,345 B1 | 4/2002 | Uenishi et al. |
| 6,388,026 B1 | 5/2002 | Campbell et al. |
| 6,399,703 B1 | 6/2002 | Fischer et al. |
| 6,461,574 B2 | 10/2002 | Korhonen et al. |
| 6,593,434 B1 | 7/2003 | Watanabe |
| 6,632,907 B1 | 10/2003 | Mizota et al. |
| 6,641,627 B2 | 11/2003 | Keipert et al. |
| 6,703,478 B2 | 3/2004 | Nakane et al. |
| 6,726,465 B2 | 4/2004 | Groleau |
| 6,740,400 B2 | 5/2004 | Kato et al. |
| 6,780,271 B1 | 8/2004 | Burmeister et al. |
| 6,906,150 B2 | 6/2005 | Kommareddi et al. |
| 6,926,873 B1 | 8/2005 | Filippi et al. |
| 6,946,519 B2 | 9/2005 | Okubo et al. |
| 6,955,277 B2 | 10/2005 | Smith et al. |
| 6,979,717 B2 | 12/2005 | Moore |
| 7,279,535 B2 | 10/2007 | Konig et al. |
| 2003/0149165 A1 | 8/2003 | Brown et al. |
| 2003/0236374 A1 | 12/2003 | Bardman et al. |
| 2004/0202814 A1 | 10/2004 | Moeller et al. |
| 2004/0235978 A1 | 11/2004 | Husemann et al. |
| 2005/0170086 A1 | 8/2005 | Tynan, Jr. et al. |
| 2007/0055032 A1 | 3/2007 | Langenbuch et al. |
| 2007/0173622 A1 | 7/2007 | Tynan et al. |
| 2008/0058482 A1 | 3/2008 | Marx et al. |
| 2008/0058483 A1 | 3/2008 | Barbieri et al. |
| 2009/0048407 A1 | 2/2009 | Barbieri et al. |
| 2010/0105847 A1* | 4/2010 | Barbieri .............. C08K 11/00 526/64 |

FOREIGN PATENT DOCUMENTS

| | | |
|---|---|---|
| EP | 1056584 | 12/2000 |
| EP | 1067352 | 1/2001 |
| EP | 1080865 | 3/2001 |
| WO | 2004/101626 | 11/2004 |
| WO | 2004/101627 | 11/2004 |
| WO | 2007/087465 | 8/2007 |
| WO | 2008/027858 | 3/2008 |

OTHER PUBLICATIONS

Benjamin Moore & Co., "Super Spec Latex Enamel Undercoater & Primer Sealer 254," 2 pages (Jun. 2002).
PCT, International Search Report and Written Opinion, International Application No. PCT/US07/60202, 6 pages (Oct. 2, 2007).
PCT, International Search Report, International Application No. PCT/US2007/076939, 4 pages (Jan. 18, 2008).
PCT, International Preliminary Report on Patentability, International Application No. PCT/US2007/076939, 8 pages (Mar. 3, 2009).
PCT, Written Opinion, International Application No. PCT/US2007/076939, 7 pages (Jan. 18, 2008).
CA, Office Action; Canadian Application No. 2,600,928 (Apr. 10, 2013).
CA, Office Action; Canadian Application No. 2,661,231 (Apr. 12, 2013).

(56) References Cited

OTHER PUBLICATIONS

US, Office Action, U.S. Appl. No. 11/620,835, 14 pages (Dec. 23, 2008).
US, Office Action, U.S. Appl. No. 11/620,835, 16 pages (May 21, 2009).
US, Advisory Action, U.S. Appl. No. 11/620,835, 8 pages (Aug. 6, 2009).
US, Office Action, U.S. Appl. No. 11/845,807, 16 pages (Dec. 17, 2009).
US, Office Action, U.S. Appl. No. 12/242,108, 16 pages (Dec. 16, 2009)
Product information entitled "Marlotherm® LH Heat Transfer Fluid," by Sasol Olefins & Surfactants GmbH, pp. 1-3 (Sep. 2004).
Product information entitled, "Zenith Pumps," by Zenith Pumps, 5 pages (Oct. 2004).
Satas, D., "Handbook of Pressure Sensitive Adhesive Technology," 1999, 3rd Ed., pp. ii-xi, 444-445, 486-487, 632-633, 684-685.
EP, Supplementary European Search Report, European Application No. 7709980.2, 7 pages (Apr. 15, 2009).
Web page of Fluitec, "Adhesives," http://www.fluitec.ch, 1 page (date of first publication unknown).
Web page of Fluitec, "Mixer/Heat-Exchangers," http://www.fluitec.ch, 1 page (date of first publication unknown).
EP, European Search Report, European Application No. 09012412.4; 6 pages (Jan. 4, 2010).
"Rubber—The Tailor-Made Material. Compouding of Elastomer Masses in a Planetary Roller Extruder." by ENTEX; 17 pages (alleged to be Jan. 2003).
CN, Office Action, Chinese Application No. 200780000114.4; 5 pages (Apr. 6, 2010).
EP, European Search Report, European Application No. 10154282.7; 6 pages (Apr. 16, 2010).
US, Office Action, U.S. Appl. No. 11/845,807; 16 pages (Jun. 7, 2010).
US, Office Action, U.S. Appl. No. 12/242,108; 24 pages (Jun. 7, 2010).
CN, First Office Action; Chinese Application No. 200780027076.1; 10 pages (May 13, 2010).
Dietmar Weiss et al.; "High-Quality Extrusion by Using Planetary Roller Extruder"; *Journal of Qingdao Institute of Chemical Technology*, vol. 11, No. 3; pp. 105-108 (Oct. 26, 1989).
US, Notice of Allowance, U.S. Appl. No. 11/845,807; 9 pages (Aug. 19, 2010).
US, Office Action, U.S. Appl. No. 12/242,108 (Sep. 9, 2010).
EP, Extended Search Report; European Application No. 11004845.1 (Sep. 5, 2011).
Leib, T.M.; Pereira, C.J., "Reaction Kinetics". In Perry's Chemical Engineers' Handbook; Green, D.W., Ed.; McGraw-Hill; 8th Edition; pp. 7-1 to 7-39 (Oct. 23, 2007).
Levenspiel, O., Ed.; "Design for Single Reactions" In Chemical Reaction Engineering; John Wiley & Sons; 3rd Ed., pp. 120-151 (1999).
StaMixCo, LLC; "Plug Flow Reactor Static Mixers Product Bulletin" (Jun. 9, 2008).
Cioffi, M., Hoffmann, A.C., and Janssen, L.P.B.M.; "Reducing the Gel Elect in Free Radical Polymerization"; Chemical Engineering Science, 56; pp. 911-915 (2001).
EP, Office Action; European Application No. 10154282.7 (Feb. 12, 2013).

\* cited by examiner

CONTINUOUS BULK POLYMERIZATION OF VINYL MONOMERS

CROSS REFERENCE TO RELATED APPLICATION

This application is a continuation of U.S. application Ser. No. 12/622,573, filed Nov. 20, 2009, which is a continuation-in-part of U.S. application Ser. No. 11/620,835, filed on Jan. 8, 2007, now abandoned, which claims the benefit of U.S. Provisional Application Ser. No. 60/761,535 filed on Jan. 24, 2006. This application is also a continuation-in-part of U.S. application Ser. No. 12/242,108, filed Sep. 30, 2008, now U.S. Pat. No. 7,906,598, issued Mar. 15, 2011, which is a continuation-in-part of U.S. application Ser. No. 11/845,807, filed Aug. 28, 2007, now U.S. Pat. No. 7,829,640, issued Nov. 9, 2010, which claims the benefit of U.S. Provisional Application Ser. No. 60/841,079 filed on Aug. 30, 2006 and U.S. Provisional Application Ser. No. 60/853,578 filed on Oct. 23, 2006, the entire contents of which are incorporated herein by reference.

BACKGROUND

This application is directed to a continuous bulk polymerization processes and associated apparatuses for preparing polymeric compositions using a recirculation tubular loop reactor system and, more particularly, a continuous bulk polymerization process that utilizes plug flow and associated apparatuses for preparing polymeric compositions, such as adhesives, using a recirculation tubular loop reactor including a planetary roller extruder (PRE) and/or static mixers.

Conventional bulk polymerization processes for producing adhesives by polymerization are known in the art. One such process includes a stirred tank reactor having a cooling jacket for removing heat from the vessel generated during the exothermic reaction therein. Such conventional processes have been somewhat effective at low conversion rates. However, at high conversion rates and associated high viscosities, the heat transfer surfaces often foul, thereby losing temperature control and facilitating runaway reactions. Mandating low conversion rates has not presented an economical solution to the problem since the excessive monomer used in low conversion operations must eventually be removed from the polymer by, for example, drying, de-volatilization or the like, thereby adding an additional processing step and associated costs. Conversions less than 95% require de-volatilization to remove the excess monomer from the polymer.

It has been found that PREs are well suited to the processing of highly exothermic reactions, such as the free radical polymerization of alkyl acrylate compounds, because thin layers of compound can be exposed to large surface areas thereby resulting in effective heat exchange, mixing and temperature control.

U.S. Published Application 2005/0170086A1 discloses a PRE which is reproduced in FIG. 1 herein. FIG. 1 shows a longitudinal section view of one example of a PRE 10' including a feeding section 12' and a compounding section 14'. The primary adhesive raw materials are added into the feed throat 16' and metered onto the conveying screw 18' of the feeding section 12'. As used herein, the term "primary raw materials" refers to those materials of the adhesive formulation added into the feed section 12' of the PRE 10'. Primary raw materials may include, but are not limited to elastomers, resins, extenders, activators, anti-degradents and crosslinking agents. The screw 18' conveys the primary raw materials into the compounding section 14'. FIG. 1 includes four planetary roller barrel sections 20'a, 20'b, 20'c and 20'd separated by dosing rings 22'a, 22'b and 22'c. Each roller barrel section 20' includes a 45° helical toothed cylinder 24', a 45° helical toothed main spindle 26' and a plurality of 45° helical toothed planetary spindles 28', 30'. The planetary spindles 28', 30' also mesh with the internal gearing of the cylinder section 24'. The helical gearing of the main spindle 26', the planetary spindles 28', 30' and the cylinder section 24' conveys the raw materials to be compounded in the direction of the discharge orifice 34'. Secondary solid raw materials can be added to the compounding section 14' through a side feeder 36' or twin screw dosing units 38'. The twin screw dosing units 38' are typically positioned perpendicular to the longitudinal axis of the compounding section 14' and are typically located near the beginning of the compounding section 14' directly adjacent to the dosing ring 22'a. The twin screw dosing units 38' can be employed to introduce solid components such as thermoplastic elastomers, resins, extenders, activators, anti-degradents, cross-linkers, etc., to the individual roller barrel sections 20'.

U.S. Pat. No. 4,324,868 teaches that a plug flow type reaction vessels like those proposed in U.S. Pat. No. 3,821,330 and JP Patent Publication No. 4193/73 are not suitable for practicing the disclosed process for the preparation of vinyl polymers by bulk or solution polymerization. The disclosed process includes recycling a portion of the polymer-containing liquid (polymerization mixture) withdrawn from the polymerization zone and returning it to the starting mixture. The process continuously introduces a polymerization starting material containing at least one vinyl monomer, preferably a methyl methacrylate, a polymerization initiator and a polymerization regulator into the polymerization zone and agitating and substantially homogeneously mixing the mixture in the polymerization zone at a temperature of 100-200° C. to effect polymerization so that the polymer content in the resulting reaction mixture is 50%-80% by weight. Likewise, U.S. Pat. No. 3,968,059 teaches that a plug flow type polymerization reactor is not preferable for use with the disclosed bulk polymerization process for polymerizing methyl methacrylate.

SUMMARY

In one aspect, methods for continuous bulk polymerization of an acrylic pressure-sensitive adhesive are disclosed. The methods include providing a planetary roller extruder having a plurality of compounding sections each including a main spindle surrounded by and intermeshed with a plurality of planetary spindles, introducing an acrylate monomer, a di-vinyl monomer, and a hydroxyl functional acrylic monomer into the planetary roller extruder, introducing an initiator into the planetary roller extruder for initiation of a free-radical polymerization of the acrylate monomer, the di-vinyl monomer, and the hydroxyl functional acrylic monomer to form an acrylic polymer, maintaining the temperature of the free-radical polymerization in the planetary roller extruder below 240° C., and discharging a portion of the acrylic polymer from the planetary roller extruder, and returning the portion of the acrylic polymer to one or more of the plurality of compounding sections in the planetary roller extruder.

The monomer to be polymerized is preferably a vinyl monomer. The polymerization of vinyl monomers are exothermic. The amount of heat generated (how exothermic the reaction is) can depend on the monomer selected, the initiator selected, any secondary monomers, and/or the presence of other additives. Since heat is generated that could accelerate the reaction and cause other complications, for example foaming and/or gelling, the heat of the reaction must be controlled.

In one embodiment, butyl acrylate is the monomer being polymerized. The polymerization of butyl acrylate is highly exothermic, which makes it much more difficult to control or abate the heat generated in the polymerization reaction of this monomer as compared to other reactive monomers, in particular other vinyl monomers.

In one embodiment, the acrylic polymer comprises, by weight, about 65% to about 95% acrylate monomer, about 5% to about 25% di-vinyl monomer, and about 1% to about 9% hydroxyl functional acrylic monomer. In another embodiment, the acrylic polymer comprises, by weight, up to about 11% di-vinyl monomer. The acrylate monomer may be one or more alkyl acrylate monomers having an alkyl group with from 2 to 20 carbon atoms, and in one embodiment is selected from the group consisting of 2-ethylhexyl acrylate, butyl acrylate, isooctyl acrylate, isodecyl acrylate, and combinations thereof. The di-vinyl monomer may be one or more of consisting of styrene, alpha methyl styrene, tetraethylene glycol diacrylate, hydroxyethyl methacrylate, methyl methacrylate, ethylacrylate, methylacrylate, propylacrylate, propylmethacrylate, hexylacrylate, hexylmethacrylate, or vinyl acetate.

In another aspect, methods for continuous bulk polymerization of an acrylic pressure-sensitive adhesive are disclosed that include providing a planetary roller extruder having a plurality of compounding sections each including a main spindle surrounded by and intermeshed with a plurality of planetary spindles, introducing an acrylate monomer and an initiator into the planetary roller extruder as an initial introduction of materials, heating the initial introduction of materials to initiate a free-radical polymerization thereof to form an acrylic polymer, introducing into the planetary roller extruder, downstream of the initial introduction of materials, a mixture of additional acrylate monomer and initiator, maintaining the temperature of the free-radical polymerization in the planetary roller extruder below 240° C., and discharging a portion of the acrylic polymer from a transfer pipe of the planetary roller extruder, and introducing the portion of the acrylic polymer to one or more of the plurality of compounding sections in the planetary roller extruder for further polymerization. The method may also include introducing a solvent into the planetary roller extruder downstream of the initial introduction of materials.

In one embodiment, introducing the initial introduction of materials includes introducing a di-vinyl monomer into the planetary roller extruder. Further, introducing the initial introduction of materials may include introducing a hydroxyl functional acrylic monomer into the planetary roller extruder.

In one embodiment, the acrylic polymer comprises, by weight, about 65% to about 95% acrylate monomer, about 5% to about 25% di-vinyl monomer, and about 1% to about 9% hydroxyl functional acrylic monomer. The acrylate monomer may be one or more alkyl acrylate monomers having an alkyl group with from 2 to 20 carbon atoms, and in one embodiment is selected from the group consisting of 2-ethylhexyl acrylate, butyl acrylate, isooctyl acrylate, isodecyl acrylate, and combinations thereof. The di-vinyl monomer may be one or more of consisting of styrene, alpha methyl styrene, tetraethylene glycol diacrylate, hydroxyethyl methacrylate, methyl methacrylate, ethylacrylate, methylacrylate, propylacrylate, propylmethacrylate, hexylacrylate, hexylmethacrylate, or vinyl acetate.

In another aspect, the reactor is a plug flow reactor with a controlled amount of monomer being mixed with recirculating polymer-in-progress. The plug flow reactor has a ratio of polymer flow rate to monomer flow rate greater than 5 or greater than 10 or greater than 15, which is advantageous because the heat of the reaction produced by the introduction of the monomer is significantly reduced and the polymer is present in an amount sufficient to readily absorb the heat of the reaction. The plug flow reactor is advantageous because applicants have found that gelling is reduced, more uniform mixing occurs, tunneling is reduced, and the heat of reaction is controlled such that heat build up is reduced. Additionally, applicants have found that the plug flow reactor provides these advantages independent of the viscosity of the reaction mixture.

In another aspect, the plug flow reactor is combined with the use of a PRE as one of the reactors in the primary recirculation loop. The PRE is advantageous to the highly exothermic polymerization of butyl acrylate because it provides a high surface area for the removal or dissipation of heat.

In another aspect, the plug flow reactor may include a secondary looped or non-looped reactor coupled to the primary loop reactor. The secondary looped or non-looped reactor further polymerizes a second portion of the polymer-in-progress to form a resulting polymer. When a primary loop reactor and a secondary looped or non-looped reactor are coupled the monomers are at least 70% converted to polymer in the primary recirculation loop reactor and are at least 94% converted to polymer in the secondary reactor or the secondary loop reactor. In another embodiment, the monomers are at least 80% converted to polymer by the primary loop reactor and are at least 95% converted to polymer by the secondary reactor or the secondary loop reactor. The resulting butyl acrylate polymer at such conversion rates have a molecular weight of up to about 300,000, and more preferably about 225,000 to about 300,000. The resulting butyl acrylate polymer also has a polydispersity of about 1.2 to 3.0, and more preferably about 1.5 to 2.5.

In another aspect, a process for continuous bulk polymerization of monomers in a plug flow reactor is disclosed. The process includes providing a plug flow reactor comprising a primary loop reactor including a loop for recirculating a portion of a polymer-in-progress at a polymer flow rate back to a reactor in the primary loop reactor, introducing a butyl acrylate monomer into the primary recirculation loop reactor at a monomer flow rate, polymerizing the monomer in the primary recirculation loop reactor in the presence of an initiator by way of a free-radical polymerization to form a polymer-in-progress, and recirculating a first portion of the polymer-in-progress through the loop into a reactor in the primary loop reactor to combine with the monomer at a ratio of polymer flow rate to monomer flow rate that is greater than 5, wherein the resulting polymer has a molecular weight of about 225,000 to about 300,000 and a polydispersity of about 1.2 to about 3.0.

In accordance with certain embodiments of the present invention, the polymer resulting from the disclosed polymerization process may be an adhesive, such as a pressure-sensitive adhesive. The adhesive may be applied to a substrates such as a web-formed material using known techniques such as a slot-die applicator to make an adhesive tape. The adhesive may be subsequently cross-linked.

| Index | Description | Index | Description |
|---|---|---|---|
| ML | Main line | FIC | Flow Indicator Control |
| AL | Additive line | PIC | Pressure Indicator Control |
| AA | Valve | LIC | Level Indicator Control |
| AT | Filter | PSA | Pressure Probe |
| CF | Flow meter | TSA | Temperature Probe |
| SI | Safety valve | HTS | N/A part number |
| SM | Static mixer | CT | N/A part number |
| CP | N/A part number | HL | Heated Line |
| FU | Frequency converter | M | Motor |
| TCU | Temperature control unit | FT | Flow Transmitter |
| TIC | Temperature Indicator Control | AP | Pump |

Figure 5:
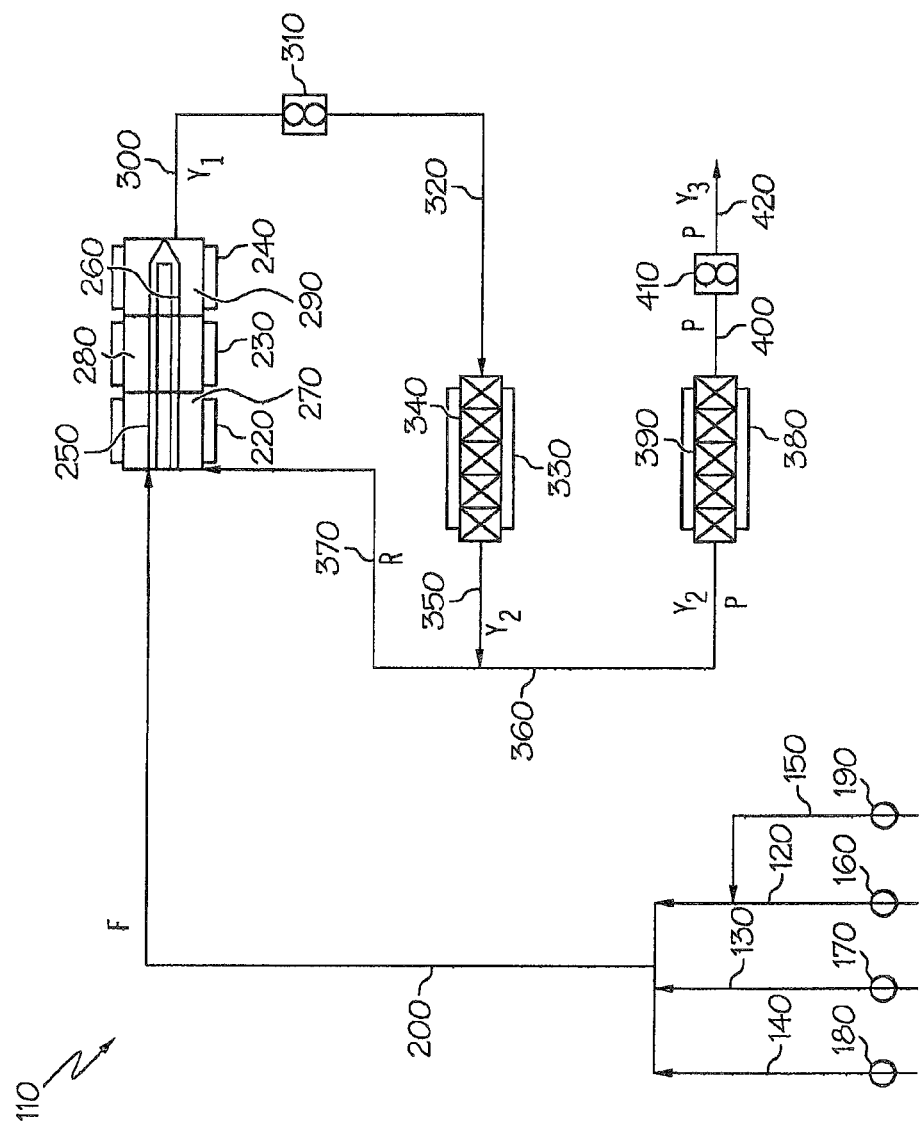

FIG. 5 is a schematic illustration of one aspect of the disclosed combined recirculation tubular loop reactor and planetary roller extruder process.

Figure 6:
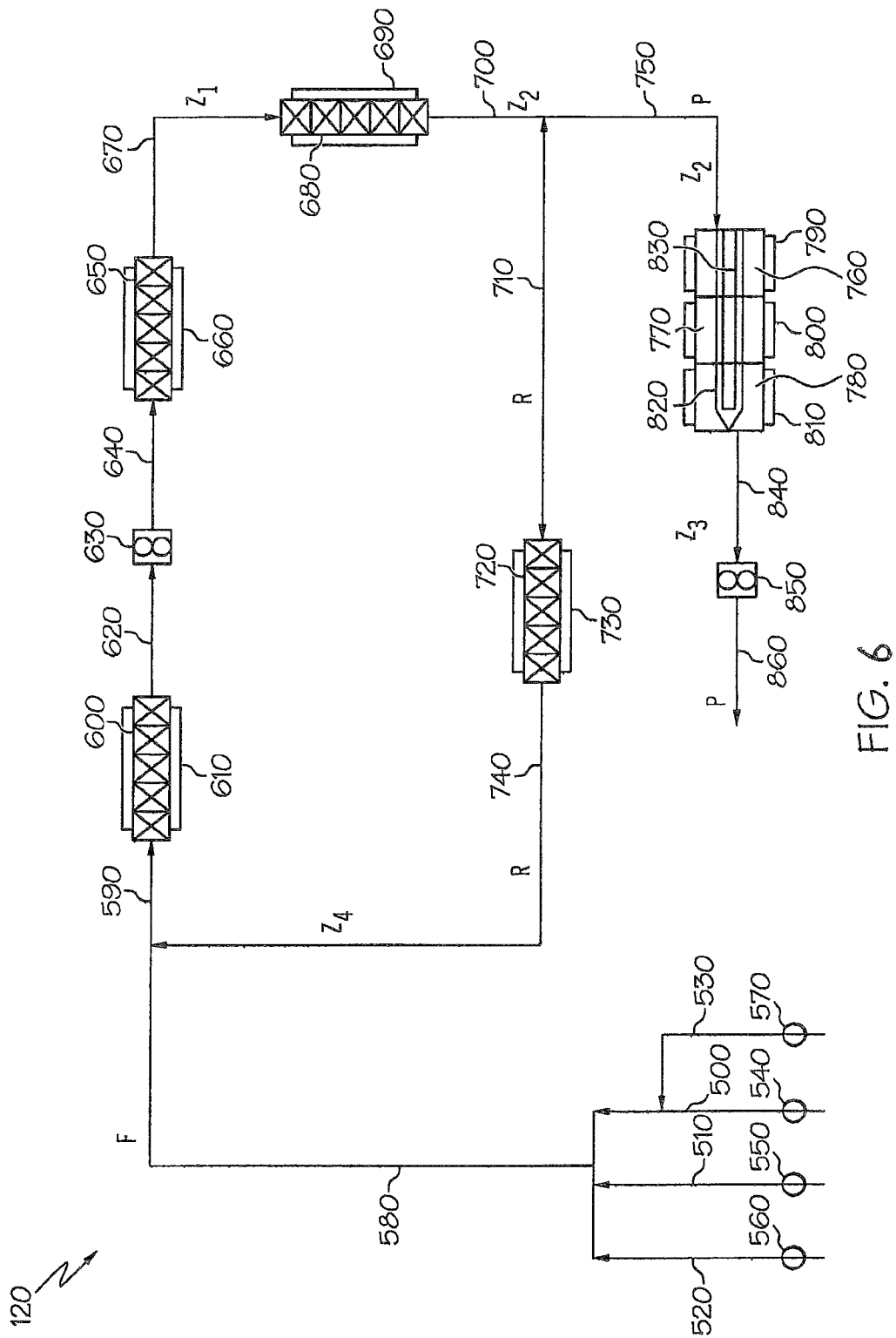

FIG. 6 is a schematic illustration of another aspect of the disclosed combined recirculation tubular loop reactor and planetary roller extruder process.

DETAILED DESCRIPTION

As used herein, "polymer-in-progress" means a mixture of polymer and un-reacted monomer produced in the primary loop reactor.

PREs typically have a filling section and a compounding section. The filling section typically includes a conveying screw to which certain raw materials are fed continuously. The conveying screw transports the material to the compounding section. The compounding section includes a driven main spindle and a number of planetary spindles which rotate around the main spindle within a roll cylinder with internal helical gearing. The rotary speed of the main spindle and hence the rotational speed of the planetary spindles can be varied and is one parameter to be controlled during the compounding and bulk polymerization process. The materials are circulated between the main and planetary spindles, or between the planetary spindles and the helical gearing of the roll section, so that the materials are dispersed to form a homogeneous composition.

Those skilled in the art will appreciate that the processes described herein may be used to produce a wide variety of polymeric materials for a variety of different uses, for example release coatings, primer coatings, adhesives, PSA and non-PSA, sealants, caulks, and architectural coatings. Moreover, these adhesives and coatings can be polymerized with a wide variety of chemistries. Specifically chemistries such as, but not limited to, acrylic monomers, polyols, isocyanates, vinyl materials, epoxies and the like.

Figure 1:
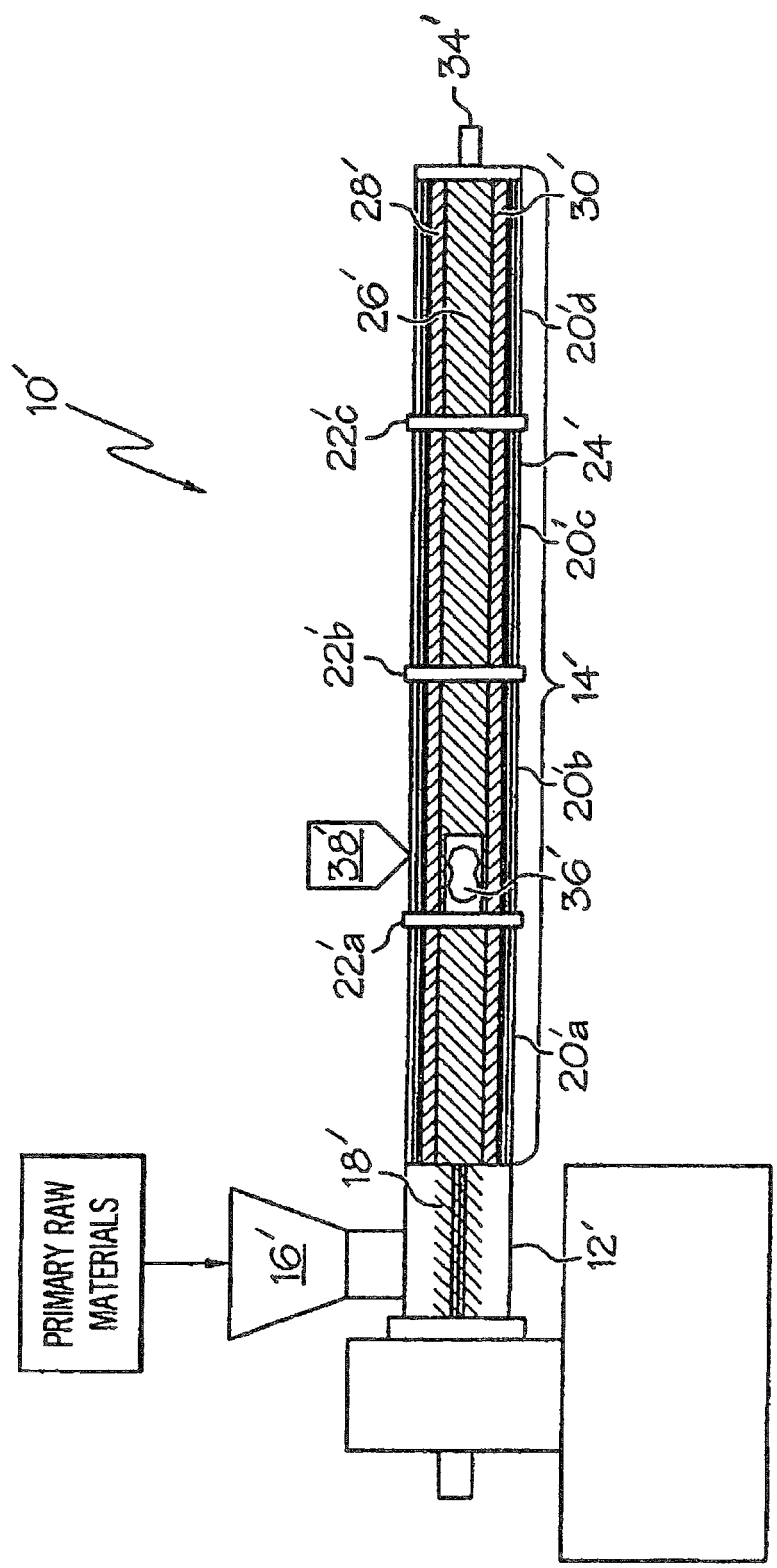
FIG. 1 is a longitudinal sectional view of a planetary roller extruder known in the art from Published Application 2005/0170086A1.
Figure 2:
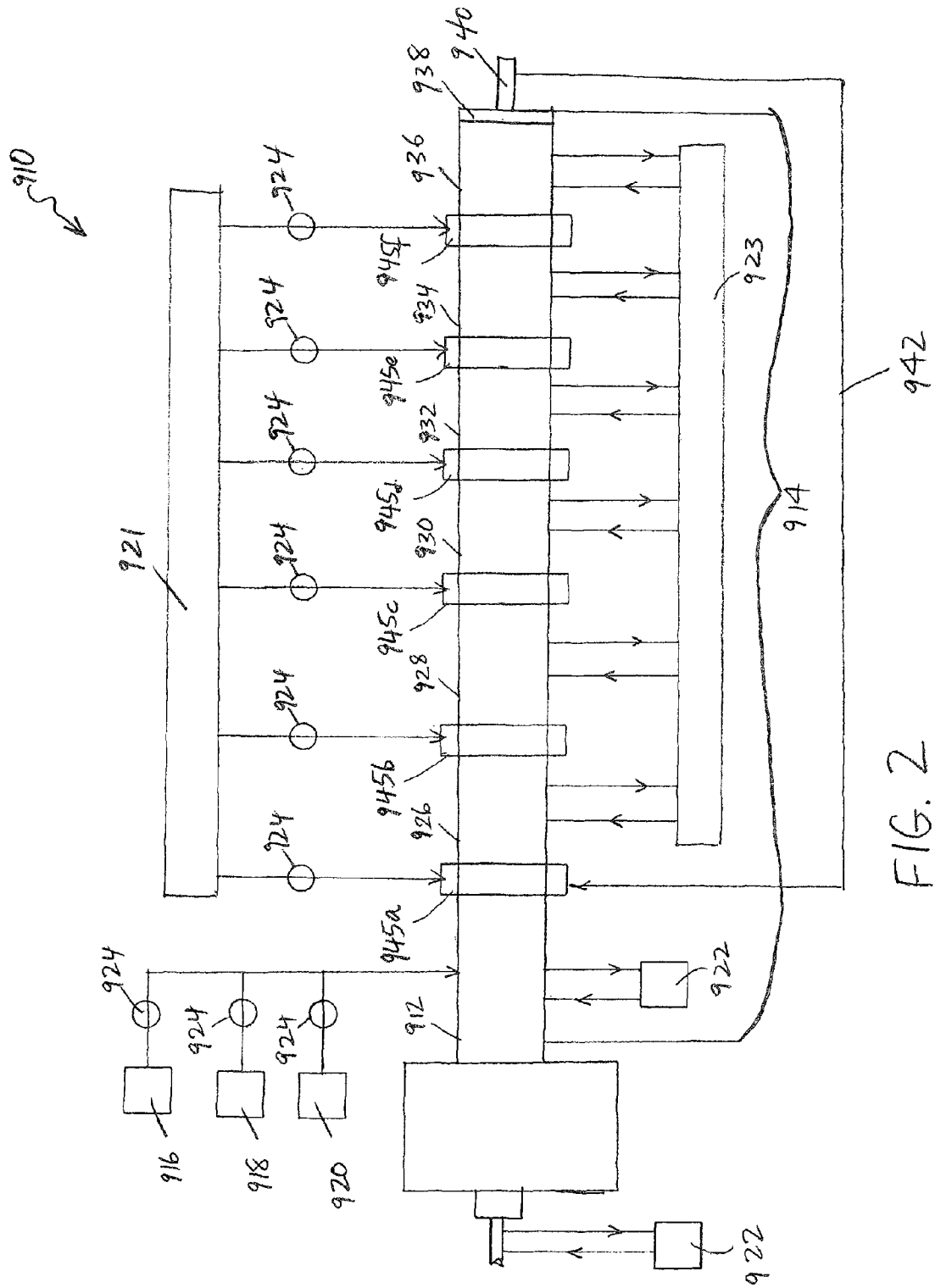
FIG. 2 is a schematic illustration of the disclosed planetary roller extruder process.

In one embodiment of the present invention, an acrylic PSA product may be prepared by the PRE process, as shown in FIG. 2, by bulk polymerization. The PRE, generally designated 910 includes consecutive compounding sections 914. The primary raw materials include a first monomer 916, a second (optional) monomer 918, an initiator 920, and secondary raw materials (e.g., the first monomer premixed with initiator) 921. The primary raw materials 916, 918, 920 are metered into the first compounding section 912, combined, and heated to a temperature sufficient to initiate the free-radical reaction process. Accurate temperature control is maintained within the first compounding section 912 by conducting the cooling water 922 through the barrel wall and close to the intermeshing surfaces, as well as through a central bore in the conveying screw. Micro-annular gear pumps 924 provide a highly precise dosage of primary raw materials 916, 918, 920 into the first compounding section 912. In one embodiment, these microannular gear pumps 924 (MZR® model 7205) are manufactured by HNP Mikrosysteme (Parchim, Germany). The reacting mixture is carried into the first planetary roller zone 926, where secondary raw materials 921 may be added to the mixture by microannular gear pumps 924 via injection nozzles (not shown) through the dispersion ring assemblies 945. At this point in the process, the highly exothermic reaction is generating heat; however, the intensive cooling of the PRE maintains the polymer process temperature below about 240° C., (e.g., the minimum degradation temperature for acrylic polymers and copolymers) by directing cooling water 923 to each planetary roller.

In one embodiment, the PRE includes a first compounding section that includes a planetary roller zone into which solid or liquid raw materials, e.g., monomers, resins, extenders, activators, antidegradents, and crosslinking agents, etc. can be introduced via injection nozzles through the dispersion or dosing ring assemblies. In one embodiment, a PRE having six compounding sections, e.g., six planetary roller barrel sections separated by stop or dosing rings. However, PRE's having as few as one to as many as twelve or more compounding sections may be used.

A second planetary roller zone 928, a third planetary roller zone 930, a fourth planetary roller zone 932, a fifth planetary roller zone 934, and a sixth planetary roller zone 936 may be adapted for further additions of the secondary raw materials 921 and the residence time required to minimize the residual monomer content of the finished polymer. The flight design in each zone may be the same or different. In the illustrated embodiment, following the sixth zone 936, the finished polymer melt exits through a chilled baffle ring 938, and may be further conveyed through a transfer pipe 940 and to a de-volatilization station (not shown) and/or a coating head (not shown). Melt temperature readouts (not shown) may be provided for each planetary roller zone 926, 928, 930, 932, 934, 936 to assist the process operator with temperature control.

The PRE includes several planetary roller zones (e.g., 926, 928, 930, 932, 934, 936). Each of these zones 926, 928, 930, 932, 934, 936 are preceded by a dispersion ring assembly 945a, 945b, 945c, 945d, 945e, 945f that allows for the introduction of the secondary raw materials 921. In one embodiment, each planetary roller zone 926, 928, 930, 932, 934, 936 consists of a 45° helical toothed cylinder, a 45° helical toothed main spindle and three or more 45° helical toothed planetary spindles but the cylinder and spindle construction may vary from one zone to the next to accommodate the polymer characteristics encountered in that zone. The maximum number of planetary spindles is a function of the diameter of the cylinder.

In one embodiment of the disclosed process shown in FIG. 2, a portion of the composition 942 exiting the transfer pipe 940 may be returned to planetary roller zone 926 using dispersion ring assembly 945*a*. Recirculation of a portion of the composition 942 exiting the transfer pipe 940 extends the polymerization reaction residence time and provides a yield of 99.5% or higher. In another embodiment, a portion of the composition 942 exiting the transfer pipe 940 may be returned to any of the planetary roller zones 926, 928, 930, 932, 934, 936 using any of the dispersion ring assemblies 945*a*, 945*b*, 945*c*, 945*d*, 945*e*, 945*f*.

The planetary spindles can exhibit many different tooth geometries, e.g., full helical flights (Planetspindel), back-cut helical flights (Noppenspindel), or zoned helical flights (Igelspindel). etc. The number of planetary spindles is a function of the diameter of the cylinder. The planetary spindles can exhibit many different tooth geometries, e.g. full helical flights (Planetspindel), back-cut helical flights (Noppenspindel), or zoned helical flights (Igelspindel), etc. A PRE with all full flight spindles does less work on the polymer than a PRE with spindles in which a portion of the flights is open or back-cut. The number of planetary spindles chosen and their geometries (e.g., open vs. full flight) can be designed in such a way as to control the rate with which material passes through the PRE and hence the dynamic discharging effect of each zone. Conventional PREs contain at least 3 and can contain up to 20 spindles, depending on the diameter of the cylinder and process design. In one embodiment of the invention, a PRE having a 70 mm diameter cylinder having 6 spindles is used.

Another factor that affects the movement of material through the PRE is the internal diameter of the stop ring. By narrowing the gap between the stop ring or doing ring and the spindle, more work can be performed on the resin.

Liquid materials, e.g. monomers, initiators, molten resins, oils, solvents, etc., may be introduced into the compounding zones 926, 928, 930, 932, 934, 936 via injection nozzles (not shown) through the dispersion ring assemblies 945*a*, 945*b*, 945*c*, 945*d*, 945*e*, 945*f*. In one embodiment of the invention, solid components, e.g., thermoplastic elastomers, tackifying resins, extenders, activators, crosslinkers, and colorants, in addition to liquid components, may be fed into the compounding sections of the PRE via a sidefeeder. Moreover, each zone 926, 928, 930, 932, 934, 936 can be modified with twin-screw dosing units (not shown). The twin screw dosing units are typically positioned perpendicular to the axis of the zones 926, 928, 930, 932, 934, 936 and are typically located near the beginning of the zones 926, 928, 930, 932, 934, 936 directly adjacent to the dispersion ring assemblies 945*a*, 945*b*, 945*c*, 945*d*, 945*e*, 945*f*. The twin-screw dosing units can be employed to introduce solid components, e.g. tackifying resins, extenders, anti-degradents, crosslinkers, etc., to the zones 926, 928, 930, 932, 934, 936.

Monomers useful according to the disclosed process 10 may include, but are not limited to, ethylenically unsaturated monomers such as alkyl acrylate monomer(s) or mixtures of alkyl acrylate monomer(s) having, for example, an alkyl group with from 2 to 20, and preferably 4 to 10 carbon atoms. Preferred alkyl acrylate monomers include: 2-ethylhexyl acrylate, butyl acrylate (BA), isooctyl acrylate, isodecyl acrylate, and any other monomers or mixtures thereof, known to those skilled in the art. Di-vinyl monomers can be used to increase the molecular weight and the internal strength of the polymer backbone and are generally employed in one embodiment in amounts up to about 11 percent by weight of the acrylic polymer. Suitable vinylic monomers employed in the practice of certain embodiments of the present invention include styrene, acrylic acid (AA), alpha methyl styrene, tetraethylene glycol diacrylate, hydroxyethyl methacrylate, methylmethacrylate, ethylacrylate, methylacrylate, propylacrylates, propylmethacrylates, hexylacrylates, hexylmethacrylates, and vinyl acetate (VA).

The introduction of monomers into consecutive planetary roller zones 926, 928, 930, 932, 934, 936 yields a random copolymer instead of block copolymer. The use of dispersion ring assemblies 945*a*, 945*b*, 945*c*, 945*d*, 945*e*, 945*f* permits one to feed reactants directly into the polymerizing mass and achieve a homogeneous blend quickly.

In one aspect, suitable polymerization initiators useful according to the disclosed processes may be any compound or combination of compounds and/or compositions that release free radicals when heated to an activation or decomposition temperature. For example, useful initiators include organic peroxides and azo compounds such as, but not limited to, hydroperoxides of olefins, di-alkyl peroxides, diaryl peroxides, alkyl polyperoxides, tranannular peroxides, peroxy acids, peroxy esters, diaryl peroxides, diaroyl peroxides, dialkyl peroxydicarbonates, peroxy derivatives of aldehydes and ketones, and more specifically tert-butyl hydroperoxide, lauroyl peroxide, tertiarybutyl peroxy(2-ethylhexanoate), benzoyl peroxide, 1,1-bis(tertiarybutylperoxy)-3,3,5-trimethylcyclohexane, azobis-isobutylnitrile, azobis-2-methylbutyronitrile, and dimethyl azobis-isobutyrate.

In the event that additional tack and/or adhesion is required, resins, oils and/or other additives may be added to the reactants and/or the final product during one of the disclosed processes. In the event that color or other properties need to be modified; pigments, dyes, fillers, anti-degradants and/or other additives may be added to the reactants and/or the final product. Typical tackifying resins may include, but are not limited to partially or fully hydrogenated wood, gum, or tall oil rosins, esterified wood, gum or tall oil rosins, alpha and beta pinene resins, and polyterpene resins. The resins can be introduced in both solid and molten form. Typical anti-degradents include antioxidants, ultraviolet absorbers, and ultraviolet stabilizers. Typical crosslinking agents may include peroxides, ionic, thermally activated resins, isocyanate, UV, and/or EB activated curing agents. Typical colorants may include titanium dioxide and other various metal pigments.

Since the processes disclosed herein are bulk polymerization processes, the polymerization reaction is generally carried out in the presence of little or no solvent. In one embodiment, the reaction is carried out in the presence of less than about 5% solvent. In another embodiment, the reaction is carried out in the presence of less than about 3% solvent. In yet another embodiment, the reaction is carried out in the presence of no solvent.

In the event that the use of solvents is desired, typical solvents may include liquid carboxylates such as ethyl acetate and n-butyl acetate, ketones such as acetone, dimethyl ketone and cyclohexanone, aromatic hydrocarbons such as benzene, toluene, and the xylenes, liquid aliphatic and cyclo-aliphatic hydrocarbons such as petroleum fractions having boiling points of between 50 and 150° C. and in particular between 60 and 100° C., cyclohexane, and others such as dioxane, tetrahydrofuran and di-t-butyl ethers or mixtures thereof. Particularly useful solvents for the polymeric composition of this disclosure may include ethyl acetate, cyclohexane, and mixtures of acetone with petroleum ether (e.g., having a boiling point of about 60 to 95° C.

Solvent can be added to yield solids percentage of about 20 to 100%. Solvent can be added into the process via injection nozzles through the dispersion ring assemblies. The solvent may be added to adjust the viscosity of the adhesive so that the adhesive to be applied via the selected coating process, e.g., low viscosity coating processes (e.g., knife over roll).

In one embodiment, the polymeric material or composition produced according to any of the disclosed processes may be crosslinked with the aid of electron beams or UV energy in a manner known in the art. For example, crosslinking the polymeric material or composition using UV energy may require the addition of appropriate UV promoters (e.g., photoinitiators, such as peroxides). If desired, the UV promoters or actinic radiation promoters may be added by way of the recirculated tubular reactor process without departing from the scope of this disclosure.

Figure 3:
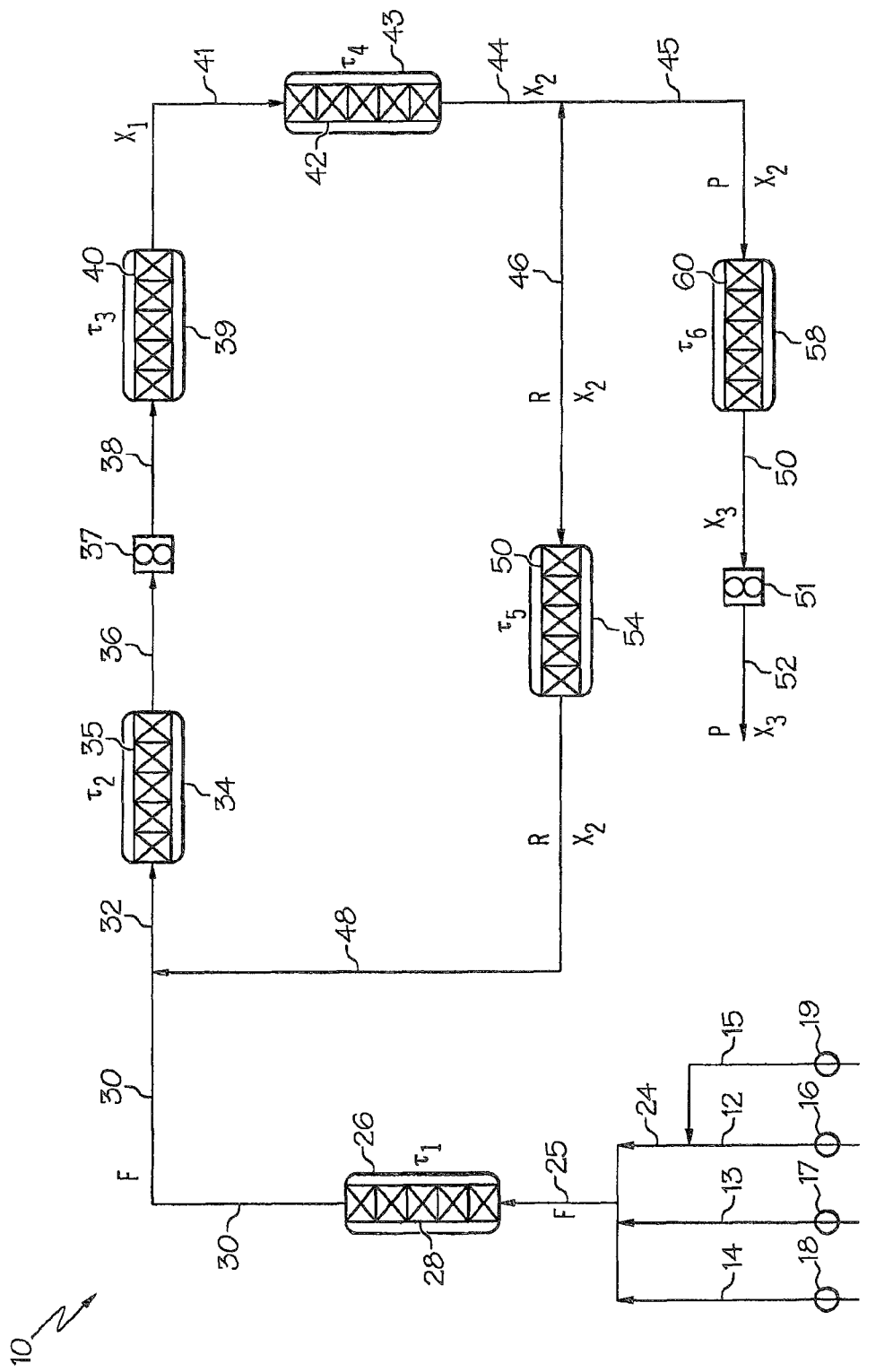
FIG. 3 is a schematic illustration of one aspect of the disclosed recirculation tubular reactor process.
Figure 4A:
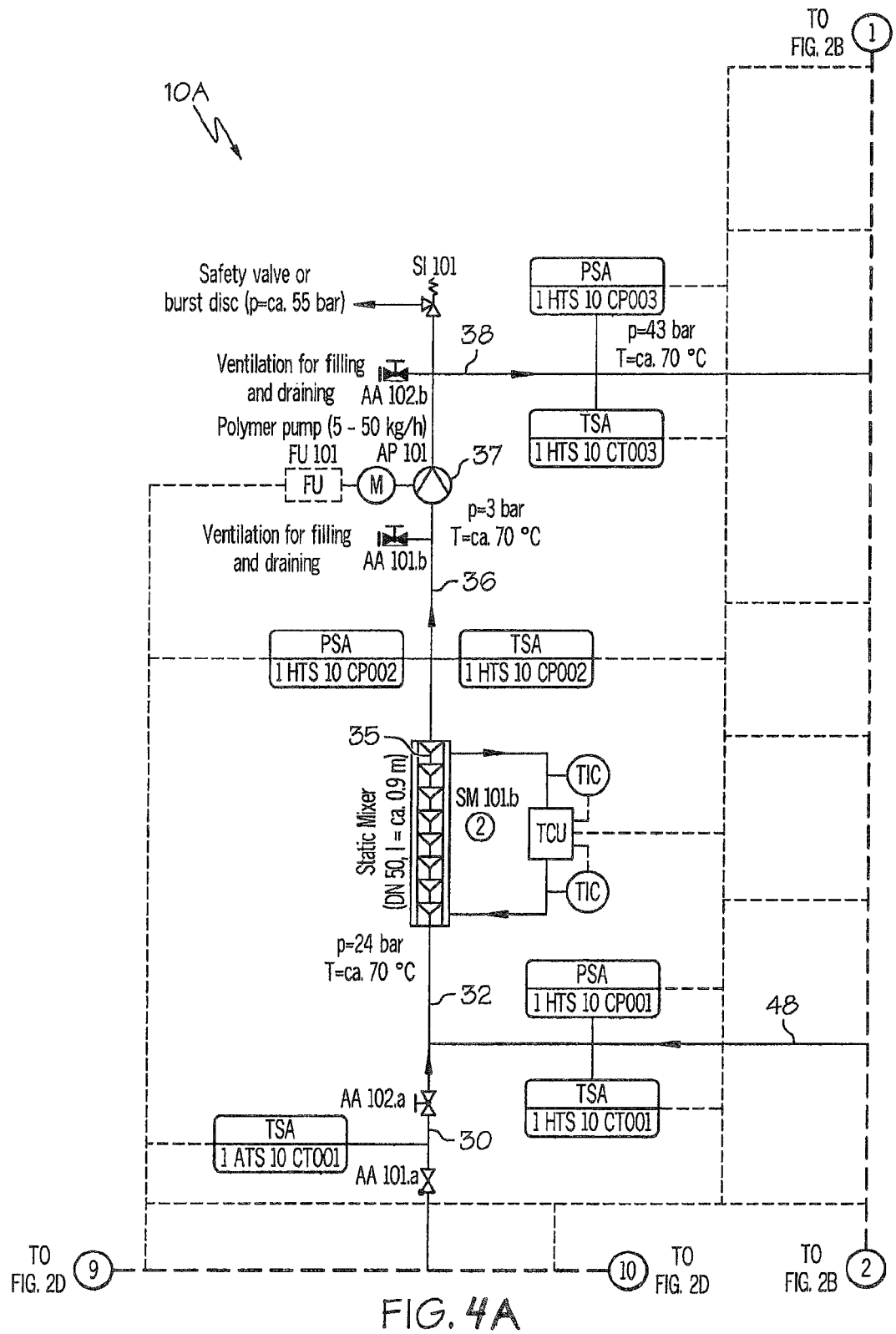
FIGS. 4A through 4E collectively are a control diagram for the process of FIG. 1. A legend for FIGS. 4A through 4E is provided below.
Figure 4B:
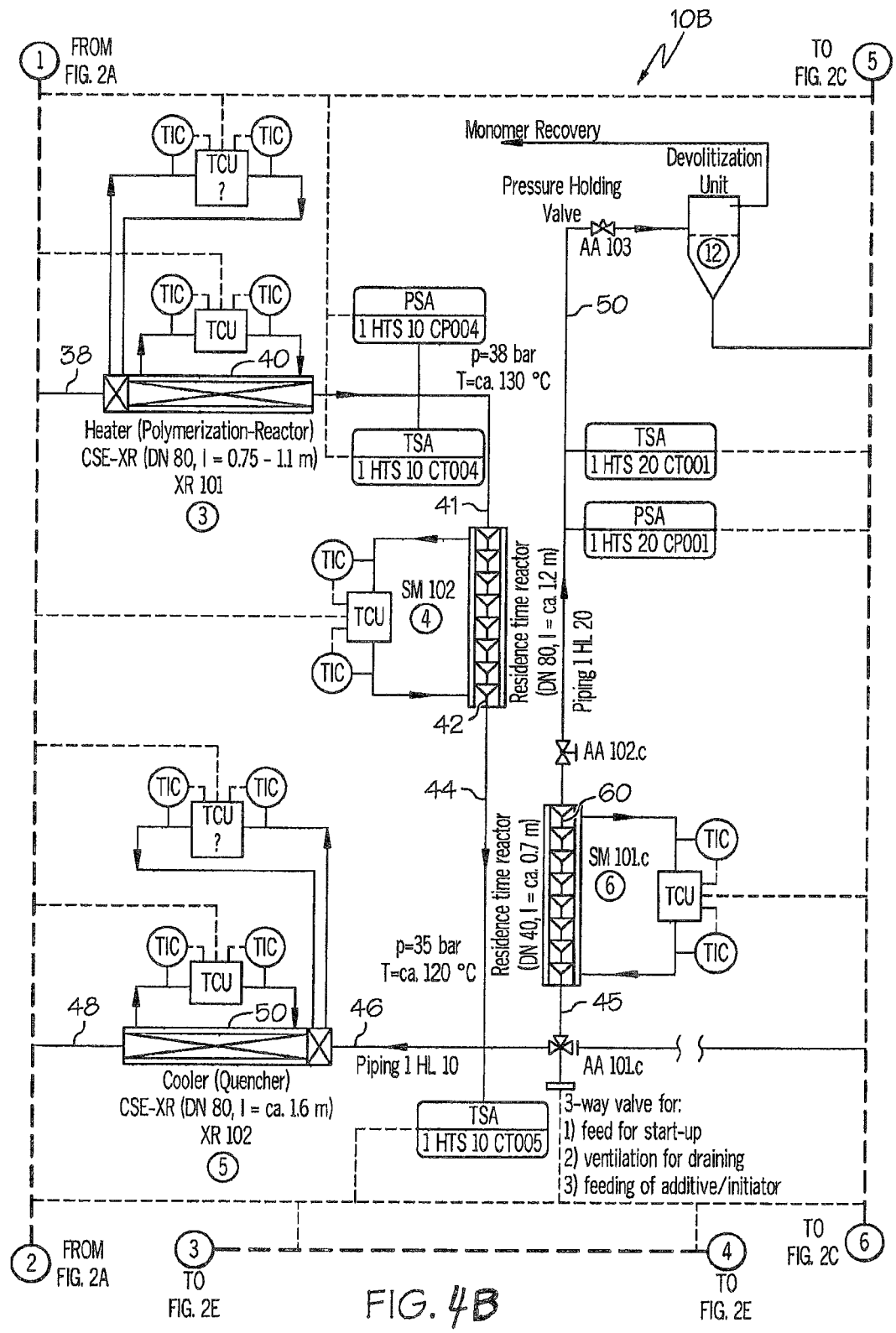
Figure 4C:
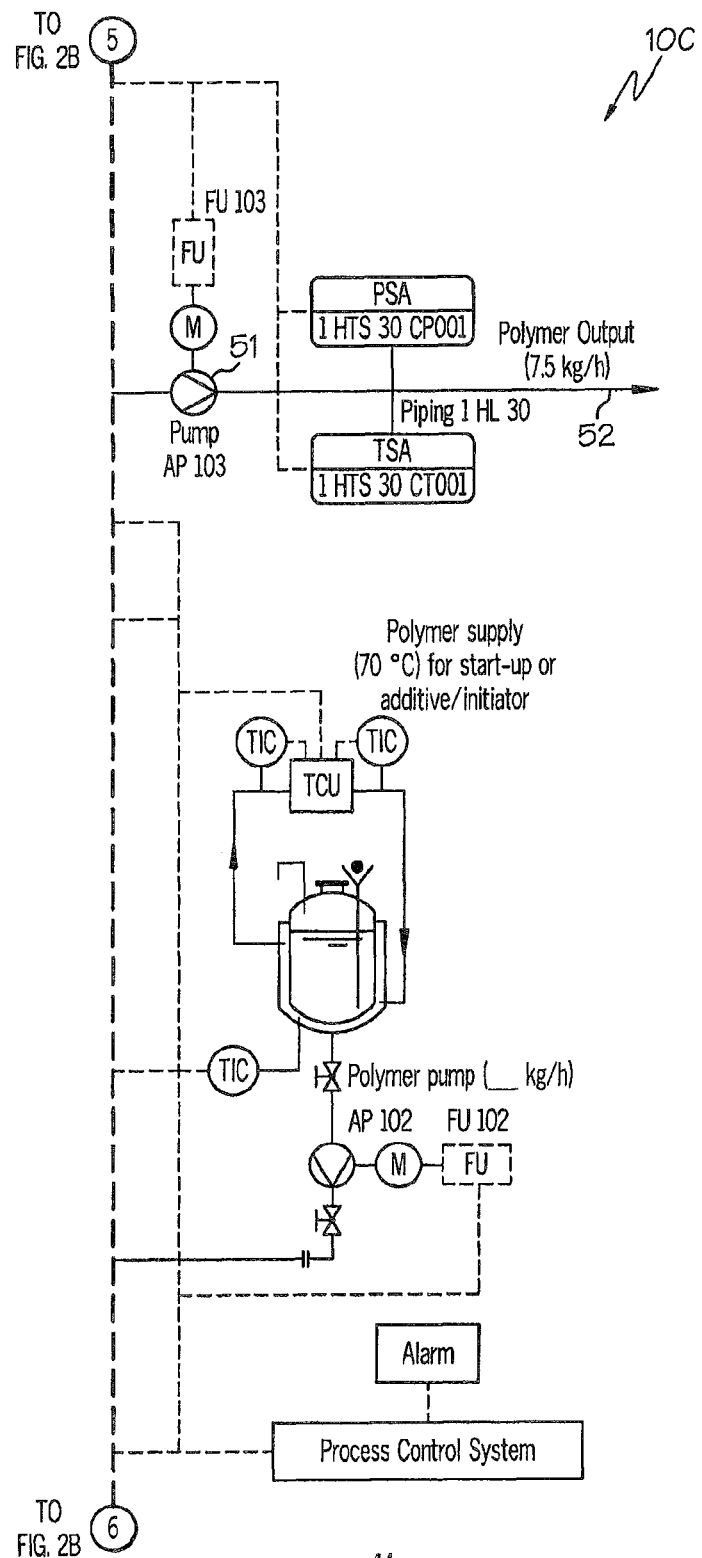
Figure 4D:
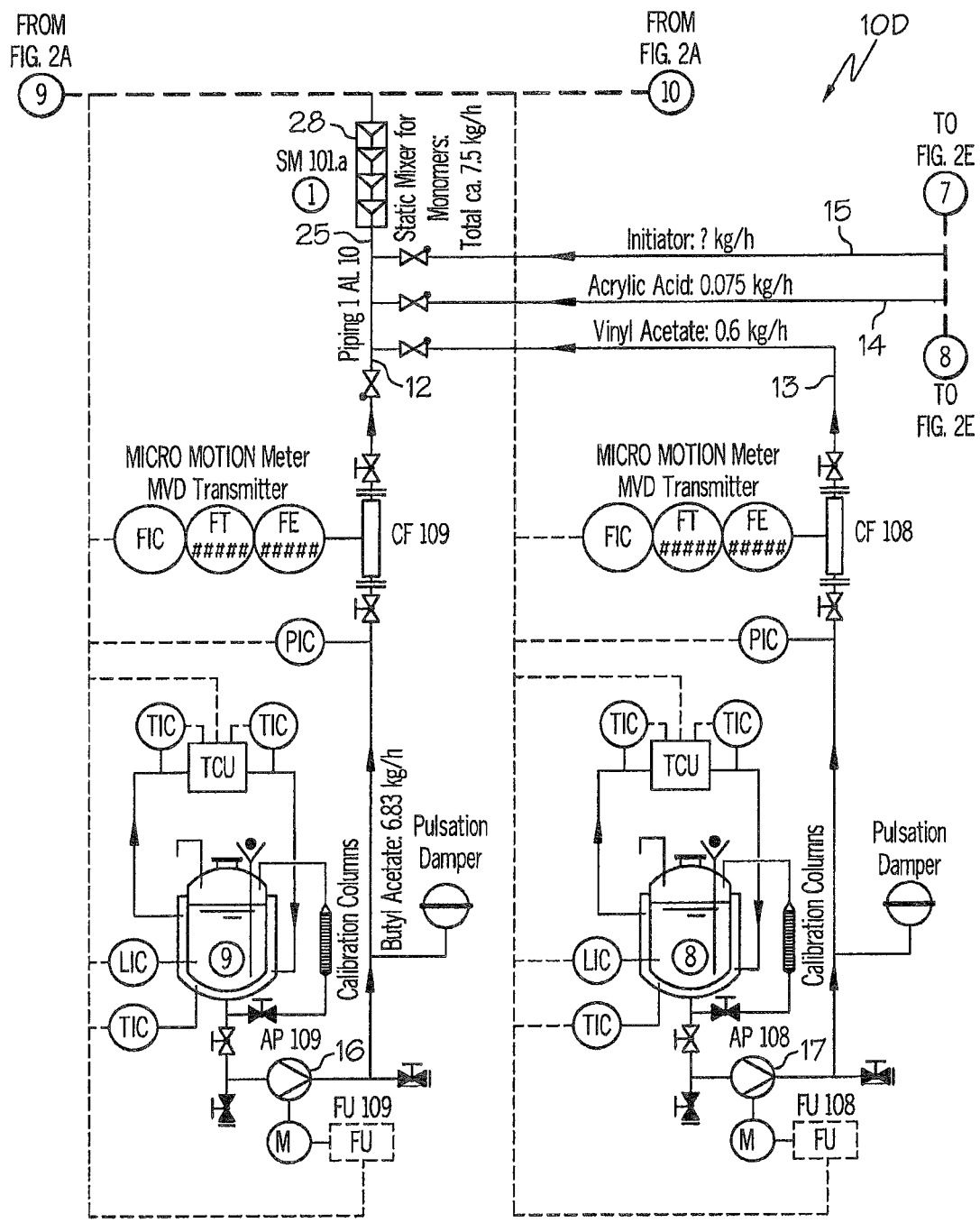
Figure 4E:
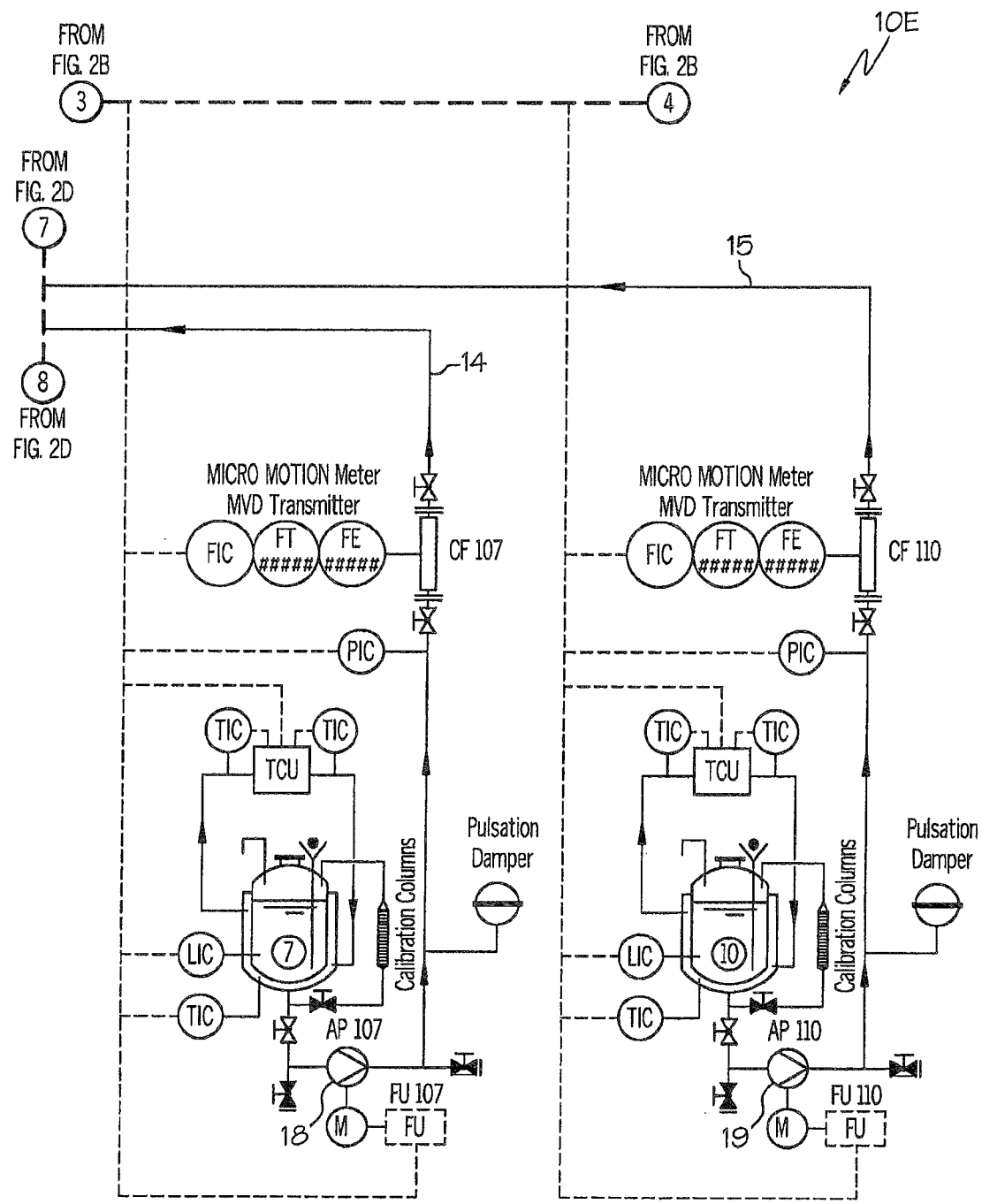

In one aspect, an adhesive product (e.g., an acrylate pressure sensitive adhesive) may be prepared according to the recirculation tubular reactor process 10 shown in FIG. 3. The primary raw materials may include a first monomer 12 (e.g., butyl acrylate or "BA"), a second monomer 13 (e.g., vinyl acetate or "VA"), a third monomer 14 (e.g., acrylic acid or "AA") and a thermal initiator 15 (e.g., azo-diisobutyronitrile or "AIBN"). Dosage of the monomers 12, 13, 14 and the initiator 15 may be regulated with pumps 16, 17, 18, 19, respectively, which may be double diaphragm pumps or the like. The flowrate of each pump 16, 17, 18, 19 may be controlled, for example, by controlling the frequency and/or the stroke-length of the piston (not shown) in each pump 16, 17, 18, 19.

Those skilled in the art will appreciate that the quantity, quality and type of monomer and initiator used is dependent upon the desired end product and that the process of FIG. 3, which illustrates the use of three monomers 12, 13, 14 and one initiator 15, is only an example. Additional initiators may be used. One or more monomers may be used. It will also be apparent that the monomer(s) and initiator(s) do not need to be mixed off-loop in the feed stream 25 but they may be introduced to the loop as individual feeds and mixed in a mixer in the loop.

In one embodiment, an adhesive or pressure sensitive adhesive is provided that is the reaction product of about 65% to about 95% by weight butyl acrylate, about 5% to about 25% by weight vinyl acetate, and about 1% to about 9% by weight acrylic acid. In one aspect, the adhesive may includes about 0.002 to about 2.0 percent by weight and, more particularly, between about 0.01 and about 1.0 percent by weight of an initiator 15 based upon the total weight of the monomers. In one embodiment, the initiator 15 is AIBN.

Polymerization reaction temperatures may be selected based upon the type of monomer material used, the decomposition temperature of the initiator material, and/or the desired polymer product desired. For example, a polymerization reaction may be carried out at a temperature of about 100° C. to about 140° C. when initiator 15 is AIBN.

Referring again to FIG. 3, the monomers 12, 13, 14 and the initiator 15 may be thoroughly mixed in a first static mixer 28. In one aspect, the initiator 15 may be initially mixed with the first monomer 12 to form a blended mixture 24 prior to entering the bulk feed stream 25 (also designated F in FIG. 3 and having units of weight per time) and flowing into the mixer 28. In one modification, the initiator 15 may be pre-mixed with the monomer having the highest throughput, thereby facilitating the distribution of the initiator.

Static mixer 28 may be characterized as having sufficient residence time $\tau_1$ to thoroughly mix the monomer 12, 13, 14 and initiator 15 and to generate an output stream 30. It should be noted that the static mixer 28 may be fitted with a jacket 26 or other heat transfer device to provide heating/cooling, should it be desired to raise or lower the temperature of the feed stock as it passes through mixer 28. The tubular reactor residence time, generally denoted $\tau$, may be defined as the ratio of the reactor vessel free-volume to the volumetric feed rate. While static mixer 28 is shown in FIG. 3 as being off-loop, those skilled in the art will appreciate that the mixer 28 could be moved into the loop itself.

Based upon an overall material balance of the process 10 illustrated in FIG. 3, the polymer product output P may be equal to the flowrate F of the monomer(s) and initiator(s). Feed stock stream 30 has a flowrate F and may be combined with a recirculating polymer stream 48 having a flowrate R to form a polymer/monomer/initiator mixed stream 32. The polymer/monomer/initiator mixed stream 32 may be fed to a static mixer 35, which may be characterized as having a sufficient residence time $\tau_2$ to thoroughly mix the stream 32. The output of vessel 35 may be output stream 36. Static mixer 35 may be fitted with a jacket 34 to provide heating and/or cooling if necessary.

The recirculation flowrate R may be defined as the volume of fluid returned to the reactor loop (i.e., the point where streams 30 and 48 merge) in a specified amount of time. The recycle ratio RR may be defined as the ratio of R to F, or alternately if F is equal to P, then RR may be defines as the ratio of R to P.

A gear pump 37 may be fluidly connected in the flow channel between the stream 36 of static mixer 35 and the inlet stream 38 to a static mixer 40, which may be characterized as having sufficient residence time $\tau_3$ to mix/react stream 38 to form stream 41. The volumetric flowrate of gear pump 37 may be the sum of F and R.

In one aspect, the stream 38 may be heated in the mixer 40 to a temperature above the activation temperature of the initiator, thereby initiating a free-radical polymerization reaction, wherein the monomer is at least partially converted to a polymer (i.e., stream 41 may have a conversion $X_1$). The mixer 40 may include a jacket 39 for providing a heating/cooling means for stream 38, 41.

The fractional conversion of liquid monomer into adhesive polymer, generally denoted $X_n$, may be calculated as follows:

$$X_n = 1 - (C_n/C_o)$$

wherein $X_n$ has a numerical value between 0 and 1, inclusive. For example, $X_1$ may be calculated as follows:

$$X_1 = 1 - (C_1/C_o)$$

wherein $C_o$ is the concentration of reactant monomer in stream 32 and $C_1$ is the concentration of reactant monomer in stream 41. In a similar manner $X_2$ may be calculated as follows:

$$X_2 = 1 - (C_2/C_o)$$

wherein $C_2$ is the concentration of reactant monomer in stream 44. Likewise, $X_3$ may be calculated as follows:

$$X_3 = 1 - (C_3/C_o)$$

where $C_3$ is the concentration of reactant monomer in stream 50.

For example, when the process 10 is used to react BA, VA and AA with AIBN to form an acrylate PSA, conversion $X_1$ may be about 0.8, conversion $X_2$ may be 0.95 and conversion $X_3$ may be 0.99, though those skilled in the art will appreciate that the actual conversions may be dependent upon the flowrates F, R, P and the sizes of the vessels 28, 35, 40, 42, 50, 60, among other factors.

The stream 41 from static mixer 40 may flow into static mixer 42 which may be characterized as having sufficient residence time $\tau_4$ to continue converting monomer into polymer to obtain a conversion $X_2$. Vessel 42 may include a jacket 43 to provide heating/cooling means to stream 41. Stream 44 may be characterized by a flowrate consisting of the sum of F and R and may be split into stream 45 having a flowrate P and stream 46 having a flowrate R. The volumetric split may be regulated by a gear pump 51, which may be fluidly connected in the flow channel between streams 50 and 52. The volumetric flowrate of gear pump 51 may be characterized as P. Alternatively, or in combination with pump 51, a three-way valve (not shown) may be located at the point where stream 45 diverges from stream 46 to regulate the recirculation flowrate R. Stream 45 may enter a static mixer 60 to further react the monomer to a conversion $X_3$. Vessel 60 may be characterized as having a sufficient residence time $\tau_6$ and heating/cooling capabilities (e.g., jacket 58) to convert stream 45 having a flowrate P at a conversion $X_2$ into stream 50 having a flowrate P at a conversion $X_3$.

The tubular reactor loop process cycle may be completed by stream 46 entering static mixer 50 at a flowrate R, which may be characterized as having sufficient residence time $\tau_5$ to cool the mass below the initiation temperature. Exit stream 48 may exit the vessel 50 while generally retaining the conversion $X_2$. Static mixer/cooler 50 may include a jacket 54 to facilitate the cooling of stream 46.

In one aspect, the total loop residence time may be the sum of $\tau_2, \tau_3, \tau_4$ and $\tau_5$. For example, the total loop residence time may be about 20 minutes such that the polymer mixture recirculates in the loop about 3 times per hour. In another aspect, gear pumps 37, 51 may be adjusted such that the total loop residence time provides about 1 to about 4 recirculations per hour. At this point, those skilled in the art will appreciate that the total residence time may be selected to obtain the desired product depending upon the type of end polymer desired and the monomers and initiators used.

In one aspect, the product stream 52 (i.e., the final product) may be applied to a web-formed material using an application unit such as a slot-die applicator. However, those skilled in the art will appreciate that the recirculation tubular reactor process 10 described herein may be used to produce a wide variety of polymeric materials for a variety of different uses. For example, the process 10 described herein may be used to produce release coatings, primer coatings, non-PSA adhesives, sealants, caulks, acrylic hybrid PSAs and non-PSA coatings, such as urethane acrylics, epoxy acrylics, styrene acrylics and the like.

Static mixers, such as continuous tubular reactors, may be characterized as having reactants introduced and products withdrawn simultaneously in a continuous manner. The reactants may enter at one end of the reactor and the products may exit at the other end, with a continuous variation in the composition of the reacting mixture in between. Heat transfer to and/or from the tubular reactor may be accomplished with jackets or a shell and tube design. Fluid media may be forced to mix themselves through a progression of divisions and recombinations within a static mixer. As a static mixer has no moving parts, the maintenance and operating costs may be significantly reduced. The energy for mixing may be delivered by the pumps 37, 51 that facilitate flow through the vessels. Tubular reactors may be characterized by the fact that the flow of fluid through the reactor is orderly with no element of fluid overtaking or mixing with any other element ahead or behind.

Static mixers can be advantageous for use in the loop reactor because they can accommodate comparatively large volumes of the reactants and thereby can provide the residence time that is required to obtain the degree of polymer conversion that is desired at a particular stage in the loop reactor. However, as the reactants polymerize in the static mixer their molecular weight and melt viscosity increase. This can make the polymerized material more difficult to circulate through the loop reactor. In one embodiment, pressures in the reactor may be greater than about 200 psi. In a still more particular embodiment, pressures may be greater than about 3,500 psi and up to about 10,000 psi. Pressure is influenced by a number of factors including tube diameter, linear velocity of the intermediate product, viscosity of the intermediate product, free volume, and static mixer configuration.

The gear pumps 37, 51 discussed herein may include a housing defining a pump cavity (not shown), a pair of intermeshing toothed gears (not shown) rotatably disposed within the pump cavity, each gear having a mounting shaft (not shown) extending axially therefrom, and a bearing means (not shown) for rotatably supporting the gear shafts. The bearing means may include a radial face disposed in facing relation to the gears and a pair of axial openings for rotatably receiving the gear shafts. The gear pumps 37, 51 may be driven externally by rotating the drive shaft of the pumps 37, 51 with a motor (not shown). As materials passes through the gear pumps 37, 51, the rotation imparted by or on the gears may be in direct proportion to the amount of material passing through the gears. Thus, the gears may act as precise devices to meter the quantity of intermediate product flowing in the channel. The volume of the gear mechanisms may be varied either by varying the size of the gears or the axial thickness of the gears.

The vessels 28, 35, 40, 42, 50, 60 described herein may have dual purposes, namely (1) elevating and/or decreasing the temperature and (2) mixing the fluid passing therethrough. The vessels 28, 35, 40, 42, 50, 60 may be "residence time reactors" because they may provide the reactants with additional time to reach the activation temperature and may provide additional mixing.

At this point, those skilled in the art will appreciate that more or less vessels 28, 35, 40, 42, 50, 60 may be used according to the process 10. For example, vessels 40, 42 may be separate vessels or may be combined as a single vessel.

For exemplary purposes only, the bulk feed stream 25 may include a BA monomer stream 12 at a flowrate of 6.83 kg/hr, a VA monomer stream 13 at a flowrate of 0.6 kg/hr, an AA monomer stream at a flowrate of 68 grams/hr and an AIBN initiator 15 at a flowrate of 2 grams/hr. The product stream 52 may be an acrylate PSA at a flowrate P of 7.5 kg/hr.

The static mixer/heater 35 may mix the low viscosity monomers/initiator with the high viscosity polymer. At 70° C., the initiator (AIBN) and monomers are present together but they do not react. Recirculation stream 48 may be 0.042 m$^3$/hr, 900 kg/m$^3$, 700 Pas; Stream 30 may be 0.00833 m$^3$/hr, 900 kg/m$^3$, 0.01 Pas; Stream 32 may be 0.05 m$^3$/hr, 900 kg/m$^3$, 583 Pas. Static mixer/heater 35 may be CSE-X/8, DN 49.5, 18 elements, Δp=ca. 21 bar, shear rate 10.5 s$^{-1}$, residence time 104 s, length approximately 900 mm, as shown in FIG. 4.

In one aspect, the gear pump 37 may be capable of pumping about 50 kg/hr of polymer with about 1,000 Pas viscosity against a pressure of about 50 bar. The flow may be controlled by the accuracy of the pump 37 (a flow meter may be optional). In one aspect, the recirculation rate R may be about 1 to about 5 times the feed-rate F.

The homogenized mixture 38 of monomer/polymer/initiator may be heated in the mixer/heat exchanger 40. By increasing the temperature from about 70° C. to about 120° C. the polymerization reaction may be induced. The exothermic heat generated may be partly absorbed by the bulk polymer and the temperature rise due to the reaction may, for example, be about 20 to about 40° C. Heating may be performed with Marlotherm® L heat transfer fluid supplied to the reactor jacket 39 (e.g., at about 120° C.). Once the reaction starts the reactor jacket 39 may operate as a cooler, thereby keeping the temperature under control. Mixture data (stream 41) may be 0.005 m$^3$/hr, 900 kg/m$^3$, 700 Pas, Cp (heat capacity) of 2,300 J/kg/° K, λ (latent heat) of 0.15 W/m/° K. Mixer/heat exchanger 40 may be a CSE-XR, DN 80, 8 elements, Δp=ca. 5 bar, shear rate 4 s$^{-1}$, residence time 170 s, length approximately 750-1,100 mm as shown in FIG. 4.

Marlotherm® LH is a high-performance synthetic, organic heat-transfer medium for use in the liquid phase in closed forced circulation unpressurized heat transfer systems at working temperatures from about 0° to about 280° C. The Marlotherm® heat transfer fluid is supplied by Sasol Olefins & Surfactants (Marl, Germany). A reaction temperature of about 120° C. may be suitably selected for the AIBN initiator, although alternatively, different thermal initiators or mixtures of thermal initiators may require a different reaction temperature.

Vessel 42 may be a double jacketed mixer and may be capable of providing additional residence time and mixing performance in order to increase the yield and the product quality. The polymer streams 41, 44 may be kept at a constant temperature (e.g., 120° C.). Mixture data (stream 44) may be characterized as 0.05 m$^3$/hr, 900 kg/m$^3$, 700 Pas. Mixer/heat exchanger 42 may be characterized as CSE-X/4, DN 80, 15 elements, Δp=ca. 3 bar, shear rate 1.6 s$^{-1}$, residence time 390 s, length approximately 1,200 mm, as illustrated in FIG. 4.

The monomer/polymer/initiator mixture may be cooled in the recirculation loop by vessel 50 from about 120° C. down to about 70° C., thereby reducing or preventing further polymerization. The cooling of vessel 50 may be performed with Marlotherm® L supplied to the jacket 54 of the vessel 50 (e.g., at about 60° C.). Mixture data (stream 48) may be 0.005 m$^3$/hr, 900 kg/m$^3$, 700 Pas, Cp of 2,300 J/kg/° K, λ of 0.15 W/m/° K. Mixer/heat exchanger 50 may be a CSE-XR, DN 80, 18 elements, Δp=ca. 11 bar, shear rate 4 s$^{-1}$, residence time 390 s, length approximately 1,600 mm, as illustrated in FIG. 4.

Vessel 60 may be a double jacketed static mixer and may provide additional residence time and mixing, thereby increasing the conversion from $X_2$ to $X_3$. The 7.5 kg/hr flow-rate P may be regulated by the gear pump 51. Mixture data (stream 52) may be characterized as 0.00833 m$^3$/hr, 900 kg/m$^3$, 700 Pas. Mixer/heat exchanger 60 may be characterized as, CSE-X/4, DN 40, 15 elements, Δp=ca. 6 bar, shear rate 2.7 s$^{-1}$, residence time 265 s, length approximately 700 mm, as shown in FIG. 4.

Flowrate, temperature, pressure, vessel level, melt viscosity and electrical power sensor readouts and various control systems may be provided to assist the process operator with process control, as illustrated in FIG. 4. Other process control features may include pressure-resistant piping, pressure-resistant valving, process start-up features, process shut-down features, 3-way valves, polymer content monitoring and residual monomer monitoring and the like.

In one aspect, a polymeric product (e.g., an acrylate pressure sensitive adhesive (PSA)) may be prepared according to the process 110 shown in FIG. 5 using a planetary roller extruder. While a PRE is illustrated in this figure, other dynamic mixers or extruders could be substituted for or used in combination with the PRE. The primary raw materials may include a first monomer 120 (e.g., butyl acrylate or "BA"), a second monomer 130 (e.g., vinyl acetate or "VA"), a third monomer 140 (e.g., acrylic acid or "AA") and a thermal initiator 150 (e.g., azo-diisobutyronitrile or "AIBN"). Dosage of the monomers 120, 130, 140 and a liquid initiator or solid initiator in solution 150, may be performed and controlled with pumps 160, 170, 180, 190, respectively, which may be double diaphragm pumps or the like. The flowrate of each pump 160, 170, 180, 190 may be controlled, for example, by controlling the frequency and/or the stroke-length in each pump 160, 170, 180, 190.

Those skilled in the art will appreciate that the quantity, quality and type of monomer and initiator used is dependent upon the desired end product and that the process of FIG. 5, which illustrates the use of three monomers 120, 130, 140 and one initiator 150, is only an example. More or fewer monomers and initiators may be used depending on the final product desired.

Monomers 120, 130, 140 and polymerization initiators 150 useful according to the disclosed process 110 may include those listed previously for disclosed process 10.

In one aspect, the initiators 150 may be used in amounts varying from about 0.002 to about 2.0 percent by weight and, more particularly, between about 0.01 and about 1.0 percent by weight, based upon the total weight of the monomer feed stock.

Referring to FIG. 5, a reactor loop, generally designated 110, is used in one aspect to prepare an acrylate polymeric product. The monomers 120, 130, 140 and a liquid initiator or solid initiator in solution 150, are provided by pumps 160, 170, 180 and 190, respectively to form a bulk feed stream 200 (having a flow rate F in FIG. 5).

The feed stream 200 is carried into the first planetary roller barrel 270 and combined with a recycled polymer stream 370 (having a recirculation flowrate R in FIG. 5), and heated to about 25 to about 240° C. to initiate the free-radical reaction process. In this embodiment, the mixture 300 is fed into a second planetary roller extruder barrel 280 and a third planetary roller barrel 290, where a preset residence time is provided to minimize the residual monomer content of the finished polymer stream 300. Individual monomers 120, 130, 140 as well as the feed stream 200 can be injected into the PRE anywhere along the length but most preferably using injection valves inserted into a spray ring before the first PRE barrel. Alternatively, it could also be injection valves inserted into any dispersion rings before and after any PRE barrels or a side port directly into a barrel or other internal and external delivery mechanisms. The recycle polymer stream 370 can be introduced into the PRE anywhere along its length but most preferably using a recirculation port in the side of a PRE barrel. Alternatively, it could also be introduced at any injection valves specially designed to handle such viscosity material at the same rings as monomer additions or other internal or external delivery mechanisms. To those skilled in the art, it is understood that the use of a three barrel PRE is only an example and barrels may be added or subtracted depending on the product desired. Temperature control is maintained within zones 270, 280, 290 for example by heating/cooling medium through the barrel walls 220, 230, 240 as well as through a central bore 250 in the central spindle 260. In one embodiment, the polymer process temperature is maintained below 240° C. (e.g., the minimum degradation temperature for acrylic polymers and copolymers).

The fractional conversion of liquid monomer into adhesive polymer, generally denoted $Y_n$, in process 110 may be calculated as follows:

$$Y_n = 1 - (C'_n/C'_o)$$

wherein $Y_n$ has a numerical value between 0 and 1, inclusive. For example, $Y_1$ may be calculated as follows:

$$Y_1 = 1 - (C'_1/C'_o)$$

wherein $C'_o$ is the concentration of reactant monomer in combined streams 200 and 370 and $C'_1$ is the concentration of reactant monomer in stream 300. In a similar manner $Y_2$ may be calculated as follows:

$$Y_2 = 1 - (C'_2/C'_o)$$

wherein $C'_2$ is the concentration of reactant monomer in stream 350. Likewise, $Y_3$ may be calculated as follows:

$$Y_3 = 1 - (C'_3/C'_o)$$

where $C'_3$ is the concentration of reactant monomer in stream 400.

Stream 300 may have a conversion $Y_1$, and a flowrate characterized as the sum of F, the flow from the feed materials, and R, the recycled feed. A gear pump 310 is fluidly connected in the flow channel between the stream 300 and the stream 320 to a static mixer 340. The volumetric flowrate of pump 310 may be but is not necessarily the sum of F and R. Those skilled in the art will recognize that as a result of the shear thinning that occurs in the PRE and other volumetric changes that can accompany the mixing of reactants, as will as compressive effects that can be accommodated within the loop reactor, the flowrate of pump 310 can vary. In general, the purpose of the pump 310 is to minimize pulsations in flowrate. The static mixer 340 may include a jacket 330 and/or other heat exchange device for providing a heating/cooling means for stream 320.

Stream 350 may have a conversion $Y_2$ and may be split into stream 360 having a flowrate P and stream 370 having a flowrate R. The volumetric split may be regulated by a pump 410, which may be fluidly connected in the flow channel between streams 400 and 420. The volumetric flowrate of pump 410 may be characterized as P. Stream 360 may enter a static mixer 390 to further react the monomer to a conversion $Y_3$. Static mixer 390 may have heating/cooling capabilities (e.g., jacket 380) to convert stream 360 having a flowrate P at a conversion $Y_2$ into stream 400 having a flowrate P at a conversion $Y_3$.

Thus by incorporating at least one PRE in the loop reactor, the reactor and process defined earlier is made more versatile. If the only mixers are static mixers, then mixing is dependent upon a threshold linear velocity of the polymeric material, above which is required to impart sufficient shear for effective mixing. With a dynamic mixer, mixing efficiency is largely independent of linear velocity of the polymeric material. Thus the option of using a PRE in the loop reactor increases mixing and heat exchange versatility of the overall reactor system.

Referring to FIG. 6, an alternative process, generally designated 120, is used in one aspect to prepare an acrylate polymeric product. The monomers 500, 510, 520 and a liquid initiator or solid initiator in solution 530, are provided by pumps 540, 550, 560 and 570, respectively to form a bulk feed stream 580 (also designated F in FIG. 6).

In one embodiment, the stream 580 may have a flowrate F and may be combined with a recirculation polymer stream 740 having a flowrate R to form a polymer/monomer/initiator mixture stream 590. The polymer/monomer/initiator mixture stream 590 may be fed to a static mixer 600, which is designed to thoroughly mix the stream 590. The output of static mixer 600 may be output stream 620. Static mixer 600 may be fitted with a jacket 610 to provide heating and/or cooling if necessary. A gear pump 630 may be fluidly connected in the flow channel between the stream 620 of static mixer 600 and the inlet stream 640 to a static mixer 650, which is designed to mix/react stream 640 to form stream 670. The volumetric flowrate of pump 37 may approximate the sum of F and R, but as mentioned earlier, the system will accommodate variations in flow.

The fractional conversion of liquid monomer into adhesive polymer, generally denoted $Z_n$, in process 120 may be calculated as follows:

$$Z_n = 1 - (C''_n/C''_o)$$

wherein $Z_n$ has a numerical value between 0 and 1, inclusive. For example, $Z_1$ may be calculated as follows:

$$Z_1 = 1 - (C''_1/C''_o)$$

wherein $C''_o$ is the concentration of reactant monomer in stream 590 and $C''_1$ is the concentration of reactant monomer in stream 670. In a similar manner $Z_2$ may be calculated as follows:

$$Z_2 = 1 - (C''_2/C''_o)$$

wherein $C''_2$ is the concentration of reactant monomer in stream 700. Likewise, $Z_3$ may be calculated as follows:

$$Z_3 = 1 - (C''_3/C''_o)$$

where $C''_3$ is the concentration of reactant monomer in stream 840.

Analogous to the earlier description, the inlet stream 640 may be heated in the static mixer 650 to a temperature above the activation temperature of the initiator, thereby initiating a free-radical polymerization reaction, wherein the monomer is at least partially converted to a polymer (i.e., stream 670 may have a conversion $Z_1$). The static mixer 650 may include a jacket 660 and/or other heat exchange device for providing a heating/cooling means for stream 640, 670.

The exiting stream 670 from static mixer 650 may flow into static mixer 680 which may be characterized as having sufficient residence time to continue converting monomer into polymer to obtain a conversion $Z_2$ in stream 700. Static mixer 680 may include a jacket 690 and/or other heat exchange device to provide heating/cooling means to streams 670, 700. Stream 700 may be split into stream 750 having a product flowrate P and recirculated stream 710 having a flowrate R. The amount of product removed from the reactor loop 120 may be regulated by a pump 850, which may be fluidly connected in the flow channel between streams 840 and 860. The volumetric flowrate of pump 850 may be characterized as P. Stream 710 may enter a static mixer 720 to further react the monomer. Static mixer 720 may be characterized as having a sufficient residence time and cooling capabilities (e.g., jacket 730) to convert stream 710 having a flowrate R into stream 740 at a temperature below the activation temperature and possible additional conversion $Z_4$ (i.e., where $C''_4$ is the concentration of reactant monomer in stream 740).

Stream 750 having a conversion $Z_2$ is carried into the first planetary roller barrel 760 and heated to about 25 to about 240° C. to continue the free-radical reaction process. The mixture is carried into a second planetary roller barrel 770 and a third planetary roller barrel 780, where a preset residence time is provided to minimize the residual monomer content of the finished polymer stream 840. Accurate temperature control can be maintained within barrels 760, 770, 780 by conducting heating/cooling medium through the barrel walls 790, 800, 810, respectively and close to the intermeshing surfaces, as well as through a central bore 830 in the central spindle 820. The polymer process temperature is maintained below the polymeric materials degradation temperature (i.e., 240° C. for butyl acrylic polymers). Planetary roller barrels 760, 770, 780 convert stream 750 having a flowrate P at a conversion $Z_2$ into stream 840 having a flowrate P at a conversion $Z_3$.

Each of the disclosed processes 910, 10, 110, and 120 may be operated under conditions that move the reactants and the polymerization product through the loop as a plug flow, and is preferred. Fluid flowing continuously through the static mixers and/or the PRE as a plug flow that is more uniformly mixed radially within each section of the mixer or PRE as it flows therethrough. The more uniform mixing provides better contact between reactants (the monomers, initiators, and any other substances or additives) for higher yields and faster reaction rates allowing residence time to be reduced. Plug flow is advantageous because it reduces the residence time distribution, resulting in a more consistent molecular weight, more consistent conversion rate, and a polymeric material or composition that has reduced gel content. More consistent molecular weight and conversion rate provides a consistent process and consistent product. Reduced gel content is beneficial because gel detracts from the performance of the final product, such as an adhesive, and may cause defects in a coating process used with the polymeric material or composition.

In one embodiment, the bulk polymerization process is carried out with a plug flow reactor that includes at least a primary recirculation loop reactor. The bulk polymerization is a solvent-free, free-radical polymerization. The primary recirculation loop reactor may be any of the loop reactors described above or variations thereof with one or more reactors in the loop. The reactors included in the recirculation loop may be connected in series or in parallel. The primary recirculation loop reactor may include any combination of reactors, such as but not limited to static mixers and planetary roller extruders. In one embodiment the primary recirculation loop reactor includes only static mixers. In another embodiment, the primary recirculation loop reactor includes at least one planetary roller extruder. The planetary roller extruder may be joined with one or more additional planetary roller extruders or static mixers.

The primary recirculation loop reactor includes a loop for recirculating at least a portion of the polymer produced in the reactors within the primary recirculation loop reactor. The recirculating polymer flows through the loop with a polymer flow rate. Monomers are introduced into the primary recirculation loop reactor at a monomer flow rate. In particular, the polymer and monomer are both introduced into a reactor, preferably the first reactor, within the primary recirculation loop reactor at the same time at their respective flow rates. In one embodiment, the polymer recirculates through the loop into the primary recirculation loop reactor to combine with the monomer being first introduced into the primary recirculation loop reactor with a ratio of polymer flow rate to monomer flow rate that is greater than 5. In another embodiment the ratio of polymer flow rate to monomer flow rate is greater than 10. In another embodiment the ratio of polymer flow rate to monomer flow rate is greater than 15.

The plug flow reactor may also include a secondary reactor or a secondary recirculation loop reactor connected to the primary recirculation loop reactor. The secondary reactor may be static or dynamic mixer, for example a static mixer or a planetary roller extruder. The secondary recirculation loop reactor may be the same as the primary recirculation loop reactor or different. The reactors included in the secondary recirculation loop may be connected in series or in parallel and may include any combination of reactors, such as but not limited to static mixers and planetary roller extruders. In one embodiment the secondary recirculation loop reactor includes only static mixers. In another embodiment, the secondary recirculation loop reactor includes at least one planetary roller extruder.

Each of the disclosed processes herein may be operated to produce a polymerization material or composition that has a molecular weight (Mw) of about 1,500 and 1,000,000. Preferably, the Mw is about 200,000 to about 400,000 as measured by gel permeation chromatography and more particularly about 225,000 to about 300,000. When the Mw is greater than 300,000 the process may become unstable due to the high viscosity of the polymer. In the disclosed processes, the Mw is maintained at or below about 300,000 so high viscosity does not become an issue and require the addition of other substances to attempt to lower it. Gel permeation chromatography techniques are well known in the art.

In each of the disclosed processes herein, the process produces a polymerization material or composition that has a polydispersity (Pd) of about 1.2 to about 3.0. A polydispersity within this range is considered as a low Pd. In one embodiment, the polydispersity is less than about 2.0. High polydispersity can result in a high degree of branching and/or gel formation which may be unfavorable characteristics in a final product, such as an adhesive. In one embodiment, the disclosed processes include the addition of chain transfer agents to aide in maintaining or achieving a low polydispersity.

In another embodiment, the reaction mixture includes a chain transfer agent in addition to the acrylic monomers and the initiator. The chain transfer agent may be a mercaptan compound, for example a primary, a secondary, or a tertiary mercaptan having an alkyl or substituted alkyl group. Suitable examples include, but are not limited to n-butylmercaptan, isobutylmercaptan, n-octylmercaptan, dodecylmercaptan, sec-butylmercaptan, sec-dodecyl mercaptan, tert-butylmercaptan, tertiary amylmercaptan, and aromatic mercaptans such as phenyl mercaptan, thiocresol and 4-tert-butyl-o-thiocresol, thioglycollic acid and its esters, and mercaptans having 3 to 18 carbon atoms, such as ethylene glycol mercaptan. These mercaptans may be used singly or in the form of a mixture of two or more of them. The mercaptan may be used in an amount of 0.01 to 1 mole % based on the monomer feed. In one embodiment, the mercaptan is used in an amount of about 0.12 mole %. In one embodiment, the chain transfer agent is dodecylmercaptan In bulk polymerization diluents such as resins and plasticizers can be added to the compounding sections to accept the heat of reaction as a means to help control the overall reaction temperature. However, in the disclosed processes there is only a small percentage of monomer being added to the loop with the remaining volume being filled with polymer, so there is no need to add resins, melt resins, or plasticizers to lower the reaction rate to prevent gelling.

In one embodiment, the loop portion of the process reactor converts at least 50% of the monomer to polymer product and, still more particularly, the loop portion of the process reactor converts at least 70% or at least 80% of the monomer to polymer product, and even more specifically, converts at least 94% of the monomer to polymer product. Then, the polymer is fed into a secondary reactor, for example a PRE or static mixer, to further convert the monomer to polymer such that at least 95% of the monomer is converted to polymer and, even more specifically, at least about 98% to about 99% of the monomer is converted to polymer. As illustrated in the examples, these conversion rates are at least achievable with a butyl acrylate monomer, more specifically with a butyl acrylate monomer, vinyl acetate, acrylic acid, and at least one initiator.

In one embodiment, the bulk polymerization of butyl acrylate, vinyl acetate, and acrylic acid in the plug flow reactor converts at least 76% of the monomers to polymer (the polymer-in-process) in the primary recirculation loop reactor and further converts the polymer-in-process to a final polymer in the secondary reactor portion for an overall conversion of monomer to polymer of 94%. This embodiment further includes a mercaptan-type chain transfer agent and an initiator in the reaction mixture, in particular a dodecylmercaptan and AIBN. In another embodiment, the bulk polymerization of butyl acrylate, vinyl acetate, and acrylic acid in the plug flow reactor converts at least 83% of the monomers to polymer (the polymer-in-process) in the primary recirculation loop reactor and further converts the polymer-in-process to a final polymer in the secondary reactor portion for an overall conversion of monomer to polymer of 98%. This embodiment also further includes a mercaptan-type chain transfer agent and an initiator in the reaction mixture, in particular a dodecylmercaptan and AIBN.

These high conversions are achieved with relatively short residence times in each reactor. For example, the resident time may be about 15 to 600 minutes and more particularly about 60 to 180 minutes. In one embodiment, the residence time within the loop portion of the process reactor is about 120 minutes for about 83% conversion of the monomer to polymer and a residence time in the secondary reactor of about 40 minutes for a final overall conversion of about 98% of the monomer to polymer.

In one aspect, the product streams from any of the processes disclosed herein may be applied to a web-formed material using an application unit such as a slot-die applicator or other application and doctoring methods.

The continuous production/production-on-demand of self-adhesive materials has the advantage of minimizing work in process, matching adhesive production with adhesive demand. This eliminates adhesive inventory and lowers overall cost.

The use of a slot-die for coating the polymeric material or composition onto web-form material has particular advantages over the traditional coating processes, e.g., roll-over-roll, reverse-roll, knife-over-roll, and the like. One slot die unit that is used in one embodiment includes a rotating spindle that trails the die lip, commonly known as a rotating lip die. One example of such a die is commercially available from SIMPLAS. Web-form adhesive coating speeds, when employing traditional coating processes may be limited to polymeric materials or compositions with viscosities of 40,000 cPs or less and are not conducive to high solids adhesives. However, the use of slot-die coating technology, particularly when employed in conjunction with high-solids polymeric materials or compositions produced by one of the disclosed processes may be of particular interest as application speeds easily achieve 500 meters per minute and approach and exceed 900 to 1000 meters per minute.

Depending on the intended use of the web-form product incorporating the polymers produced according to the disclosed processes, suitable web-form carrier materials may include any known carriers, with or without appropriate chemical or physical surface pretreatment of the coating side, and with or without anti-adhesive physical treatment or coating of the reverse side. Representative examples include: creped, non-creped, and release papers, polyethylene, polypropylene, mono- or biaxially oriented polypropylene films, polyester, polyamide, PVC, release and other films, as well as foamed materials, wovens, knits, and nonwovens in web form made from polyolefins.

Example 1

One example of the process is as follows. A feed stream containing 89.8% by volume butyl acrylate, 9% vinyl acetate, 1% acrylic acid, 0.2% dodecylmercaptan and 0.5 mg/mL AIBN was injected into a primary recirculating loop reactor with continuous static mixing at a rate of 0.5 mL/min. The primary recirculating loop reactor included 60 static mixers in series and a loop for recirculating the resulting polymer-in-process. The reactor had a volume of 60 mL, a residence time of 120 minutes, was heated to 80° C. and operated at a recirculation rate of 9 mL/min. The resulting polymer-in-process had a conversion of 83% and a reactor pressure of 2,400 psi. The polymer-in-process was directly fed into a secondary reactor that included continuous static mixing for increased residence time at a rate of 0.5 mL/min. This reactor had a volume of 20 mL, residence time of 40 minutes, was heated to 80° C. and experienced a pressure of 1,500 psi. The resulting polymer had an overall conversion of 98% a weight average molecular weight of 300,000, a number average molecular weight of 130,000 and a polydispersity (PDI) of 2.3. After the process was started and equilibrated, product properties were maintained for an additional 32 hours, to demonstrate stability.

Example 2

A feed stream containing 89.8% by volume butyl acrylate, 9% vinyl acetate, 1% acrylic acid, 0.2% dodecylmercaptan and 0.5 mg/mL AIBN was injected into the primary recirculation loop reactor with continuous static mixing at a rate of 0.9 mL/min. The primary recirculation loop reactor included 60 static mixers in series and a loop for recirculating the resulting polymer-in-process. The reactor had a volume of 60 mL, a residence time of 67 minutes, was heated to 100° C. and operated at a recirculation rate of 11 mL/min. The resulting polymer-in-process had a conversion of 76% and a reactor pressure of 2,000 psi. The polymer-in-process was directly fed into a secondary recirculation loop reactor with continuous static mixing for increased residence time at a rate of 0.5 mL/min. The secondary recirculation loop reactor included 60 static mixers in series and a loop for recirculating the resulting polymer-in-process. This reactor had a volume of 30 mL, residence time of 33 minutes, was heated to 80° C. and experienced a pressure of 3,100 psi. The resulting polymer had an overall conversion of 94% a weight average molecular weight of 280,000, a number average molecular weight of 180,000 and a polydispersity (PDI) of 1.7.

Although the disclosed polymerization processes have been shown and described with respect to certain aspect and embodiments, modifications will occur to those skilled in the art upon reading and understanding the specification. The disclosed polymerization process includes all such modifications. In particular, while the discussion herein focuses on a particular embodiment for manufacturing an adhesive, those skilled in the art will recognize that the invention has application to the manufacture of polymeric material or compositions in general.

What is claimed is:

1. A method for continuous bulk polymerization of an acrylic pressure-sensitive adhesive, the method comprising:
    providing a planetary roller extruder having a plurality of planetary roller zones;
    introducing an alkyl acrylate monomer and one or more other vinylic monomers into the planetary roller extruder;
    introducing an initiator into the planetary roller extruder for initiation of a free-radical polymerization of the alkyl acrylate monomer and the one or more other vinylic monomers to form an acrylic polymer;
    maintaining the temperature of the free-radical polymerization in the planetary roller extruder below 240° C.; and
    discharging a portion of the acrylic polymer from the planetary roller extruder, and returning the portion of the acrylic polymer to one or more of the plurality of planetary roller zones.

2. The method of claim 1 wherein the acrylic polymer comprises, by weight, about 65% to about 95% alkyl acrylate monomer.

3. The method of claim 2 wherein the acrylic polymer comprises, by weight, about 5% to about 25% vinyl acetate as one of the one or more other vinylic monomers.

4. The method of claim 2 wherein the acrylic polymer comprises, by weight, up to about 11% di-vinyl monomer.

5. The method of claim 3 wherein the acrylic polymer comprises, by weight, about 1% to about 9% acrylic acid.

6. The method of claim 2 wherein the alkyl acrylate monomer comprises an alkyl group with from 2 to 20 carbon atoms.

7. The method of claim 2 wherein the alkyl acrylate monomer is selected from the group consisting of 2-ethylhexyl acrylate, butyl acrylate, isooctyl acrylate, isodecyl acrylate, and combinations thereof.

8. The method of claim 2 wherein the other vinylic monomers are selected from the group consisting of styrene, alpha methyl styrene, tetraethylene glycol diacrylate, hydroxyethyl methacrylate, vinyl acetate, and combinations thereof.

9. The method of claim 1 wherein the acrylic polymer is a random copolymer.

10. The method of claim 1 further comprising introducing a solvent into one or more of the plurality of planetary roller zones.

11. A method for continuous bulk polymerization of an acrylic pressure-sensitive adhesive, the method comprising:
    providing a planetary roller extruder having a plurality of planetary roller zones;
    introducing an acrylate monomer and an initiator into the planetary roller extruder as an initial introduction of materials;
    heating the initial introduction of materials to initiate a free-radical polymerization thereof to form an acrylic polymer;
    introducing into the planetary roller extruder, downstream of the initial introduction of materials, a mixture of additional acrylate monomer and initiator;
    maintaining the temperature of the free-radical polymerization in the planetary roller extruder below 240° C.; and
    discharging a portion of the acrylic polymer from a transfer pipe of the planetary roller extruder, and introducing the portion of the acrylic polymer to one or more of the plurality of planetary roller zones.

12. The method of claim 11 wherein introducing the initial introduction of materials further comprises introducing a di-vinyl monomer into the planetary roller extruder.

13. The method of claim 11 wherein introducing the initial introduction of materials further comprises introducing acrylic acid and/or hydroxyethyl methacrylate into the planetary roller extruder.

14. The method of claim 11 wherein the acrylic polymer comprises, by weight, about 65% to about 95% of an alkyl acrylate monomer.

15. The method of claim 13 wherein the acrylic polymer comprises, by weight, about 5% to about 25% vinyl acetate.

16. The method of claim 15 wherein the acrylic polymer comprises, by weight, about 1% to about 9% acrylic acid.

17. The method of claim 11 wherein the acrylate monomer comprises one or more alkyl acrylate monomers having an alkyl group with from 2 to 20 carbon atoms.

18. The method of claim 14 wherein the alkyl acrylate monomer is selected from the group consisting of 2-ethylhexyl acrylate, butyl acrylate, isooctyl acrylate, isodecyl acrylate, and combinations thereof.

19. The method of claim 12 wherein the acrylate monomers are selected from the group consisting of tetraethylene glycol diacrylate, hydroxyethyl methacrylate, methyl methacrylate, ethylacrylate, methylacrylate, propylacrylate, propylmethacrylate, hexylacrylate, hexylmethacrylate, and combinations thereof.

20. The method of claim 11 further comprising introducing a solvent into one or more of the plurality of planetary roller zones.

21. The method of claim 11 wherein introducing the initial introduction of materials further comprises introducing other vinylic monomers into the planetary roller extruder.

22. The method of claim 21 wherein the other vinylic monomers comprise styrene, alpha methyl styrene, and vinyl acetate, and combinations thereof.

* * * * *